(12) United States Patent
Seki et al.

(10) Patent No.: US 10,497,130 B2
(45) Date of Patent: Dec. 3, 2019

(54) MOVING INFORMATION ANALYZING SYSTEM AND MOVING INFORMATION ANALYZING METHOD

(71) Applicant: Panasonic Intellectual Property Management Co., Ltd., Osaka (JP)

(72) Inventors: Nobuhito Seki, Fukuoka (JP); Tetsuo Tayama, Fukuoka (JP); Shinpei Hagisu, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/484,931

(22) Filed: Apr. 11, 2017

(65) Prior Publication Data

US 2017/0330330 A1    Nov. 16, 2017

(30) Foreign Application Priority Data

May 10, 2016 (JP) ................... 2016-094883
May 10, 2016 (JP) ................... 2016-094884

(51) Int. Cl.
*G06T 7/215* (2017.01)
*G06T 7/292* (2017.01)
*H04N 7/18* (2006.01)

(52) U.S. Cl.
CPC .............. *G06T 7/215* (2017.01); *G06T 7/292* (2017.01); *H04N 7/181* (2013.01);
(Continued)

(58) Field of Classification Search
CPC ......... H04N 7/181; G06T 7/215; G06T 7/254; G06T 7/292; G06T 11/00;
(Continued)

(56) References Cited

U.S. PATENT DOCUMENTS 4,179,704 A    12/1979 Moore et al.
4,233,631 A    11/1980 Mahler
(Continued)

FOREIGN PATENT DOCUMENTS

JP    8-242987 A    9/1996
JP    11-64505 A    3/1999
(Continued)

OTHER PUBLICATIONS

MOBOTIX, "MxAnalytics Camera-Integrated Video Analysis With The MOBOTIX Q24," Security Vision Systems, 6 pages.
(Continued)

*Primary Examiner* — Katrina R Fujita
(74) *Attorney, Agent, or Firm* — Seed IP Law Group LLP

(57) ABSTRACT

Each of cameras generates a background image of an imaging region captured by the camera, extracts moving information regarding a staying position or a passing position of a moving object in the imaging region of the camera, and transmits the background image and moving information of the moving object in a specific period to a server in response to a transmission request from the server or an input device. In a case where a first moving information analysis image in which moving information of a moving object in an imaging region of a first camera is superimposed on the background image transmitted from the first camera among the plurality of cameras is generated and displayed on a monitor, the server generates a second moving information analysis image in which moving information of a moving object in an imaging region of a second camera is superimposed on the background image transmitted from the second camera which is different from the first camera in response to a camera switching operation, and displays the second moving information analysis image on the monitor.

9 Claims, 23 Drawing Sheets

(52) U.S. Cl.
CPC ............... *G06T 2207/10016* (2013.01); *G06T 2207/30196* (2013.01); *G06T 2207/30232* (2013.01); *G06T 2207/30241* (2013.01)

(58) Field of Classification Search
CPC . G06T 2207/10016; G06T 2207/10024; G06T 2207/30232; G06T 2207/30241
See application file for complete search history.

(56) References Cited

U.S. PATENT DOCUMENTS

| | | | |
|---|---|---|---|
| 6,295,367 | B1 | 9/2001 | Crabtree et al. |
| 6,992,702 | B1* | 1/2006 | Foote .................... G06F 3/0386 348/211.8 |
| 7,590,261 | B1 | 9/2009 | Mariano et al. |
| 7,957,565 | B1 | 6/2011 | Sharma et al. |
| 7,974,869 | B1 | 7/2011 | Sharma et al. |
| 8,009,863 | B1 | 8/2011 | Sharma et al. |
| 8,098,888 | B1 | 1/2012 | Mummareddy et al. |
| 8,098,891 | B2 | 1/2012 | Lv et al. |
| 8,189,926 | B2 | 5/2012 | Sharma et al. |
| 8,280,153 | B2* | 10/2012 | Cobb .................... G06T 11/206 382/103 |
| 8,289,390 | B2 | 10/2012 | Aggarwal et al. |
| 8,310,542 | B2 | 11/2012 | Girgensohn et al. |
| 8,355,046 | B2 | 1/2013 | Fujii |
| 8,380,558 | B1 | 2/2013 | Sharma et al. |
| 8,558,892 | B2* | 10/2013 | Brodsky ............... G01S 3/7864 348/155 |
| 8,614,744 | B2 | 12/2013 | Brown et al. |
| 8,964,036 | B2 | 2/2015 | Golan et al. |
| 8,965,042 | B2 | 2/2015 | Borger et al. |
| 9,361,520 | B2 | 6/2016 | Collins et al. |
| 9,430,923 | B2 | 8/2016 | Kniffen et al. |
| 9,436,692 | B1 | 9/2016 | Fang |
| 9,569,786 | B2 | 2/2017 | Shaw et al. |
| 9,659,598 | B2 | 5/2017 | Adam et al. |
| 9,679,200 | B2 | 6/2017 | Schlattmann et al. |
| 9,875,408 | B2 | 1/2018 | Adachi |
| 10,120,536 | B2* | 11/2018 | Cha ........................ G06F 3/0483 |
| 2002/0085092 | A1 | 7/2002 | Choi et al. |
| 2003/0053659 | A1 | 3/2003 | Pavlidis et al. |
| 2005/0043933 | A1 | 2/2005 | Rappaport et al. |
| 2005/0169367 | A1 | 8/2005 | Venetianer et al. |
| 2005/0185823 | A1 | 8/2005 | Brown et al. |
| 2005/0288911 | A1 | 12/2005 | Porikli |
| 2006/0062431 | A1 | 3/2006 | Low |
| 2006/0187305 | A1 | 8/2006 | Trivedi et al. |
| 2006/0285723 | A1* | 12/2006 | Morellas ............ G06K 9/00369 382/103 |
| 2007/0229663 | A1 | 10/2007 | Aoto et al. |
| 2007/0248244 | A1 | 10/2007 | Sato et al. |
| 2007/0296814 | A1* | 12/2007 | Cooper ................ H04N 19/503 348/143 |
| 2008/0130949 | A1 | 6/2008 | Ivanov et al. |
| 2008/0212099 | A1 | 9/2008 | Chen |
| 2009/0002489 | A1 | 1/2009 | Yang et al. |
| 2009/0134968 | A1 | 5/2009 | Girgensohn et al. |
| 2009/0222388 | A1 | 9/2009 | Hua et al. |
| 2009/0268028 | A1 | 10/2009 | Ikumi et al. |
| 2010/0002082 | A1* | 1/2010 | Buehler ........... G08B 13/19645 348/159 |
| 2010/0013931 | A1* | 1/2010 | Golan ................ G06K 9/00771 348/150 |
| 2010/0013935 | A1 | 1/2010 | Ma et al. |
| 2010/0045799 | A1 | 2/2010 | Lei et al. |
| 2010/0225765 | A1* | 9/2010 | Kadogawa ............. H04N 7/181 348/159 |
| 2011/0002548 | A1* | 1/2011 | Sivakumar ....... G08B 13/19682 382/199 |
| 2011/0072037 | A1 | 3/2011 | Lotzer |
| 2011/0199461 | A1 | 8/2011 | Horio et al. |
| 2011/0205355 | A1 | 8/2011 | Liu et al. |
| 2011/0231419 | A1 | 9/2011 | Papke et al. |
| 2012/0045149 | A1 | 2/2012 | Arai et al. |
| 2012/0163657 | A1* | 6/2012 | Shellshear ......... G06K 9/00751 382/103 |
| 2012/0242853 | A1 | 9/2012 | Jasinski et al. |
| 2013/0091432 | A1* | 4/2013 | Shet .................. G08B 13/19645 715/719 |
| 2013/0147961 | A1* | 6/2013 | Gao ........................ H04N 7/181 348/159 |
| 2013/0223688 | A1 | 8/2013 | Golan et al. |
| 2014/0023233 | A1 | 1/2014 | Stefanovic |
| 2014/0119594 | A1 | 5/2014 | Chou et al. |
| 2014/0125805 | A1 | 5/2014 | Golan et al. |
| 2014/0226855 | A1 | 8/2014 | Savvides et al. |
| 2014/0355829 | A1 | 12/2014 | Heu et al. |
| 2015/0120237 | A1 | 4/2015 | Gouda et al. |
| 2015/0187088 | A1 | 7/2015 | Iwai et al. |
| 2015/0222861 | A1 | 8/2015 | Fujii et al. |
| 2015/0278608 | A1 | 10/2015 | Matsumoto et al. |
| 2015/0286866 | A1 | 10/2015 | Kawaguchi et al. |
| 2015/0289111 | A1 | 10/2015 | Ozkan |
| 2015/0379725 | A1 | 12/2015 | Kuwahara et al. |
| 2016/0063712 | A1 | 3/2016 | Matsumoto et al. |
| 2016/0104174 | A1 | 4/2016 | Matsumoto et al. |
| 2016/0142679 | A1 | 5/2016 | Miyoshi et al. |
| 2016/0307049 | A1 | 10/2016 | Hagisu et al. |
| 2016/0309096 | A1 | 10/2016 | Hagisu et al. |
| 2016/0349972 | A1 | 12/2016 | Miyoshi et al. |
| 2017/0330434 | A1 | 11/2017 | Takahashi et al. |
| 2017/0337426 | A1 | 11/2017 | Werner et al. |
| 2017/0351924 | A1 | 12/2017 | Hotta et al. |
| 2017/0352380 | A1 | 12/2017 | Doumbouya et al. |
| 2018/0048789 | A1 | 2/2018 | Hayashi |

FOREIGN PATENT DOCUMENTS

| | | |
|---|---|---|
| JP | 11-144192 A | 5/1999 |
| JP | 2003-205159 A | 7/2003 |
| JP | 2003-256843 A | 9/2003 |
| JP | 2005-148863 A | 6/2005 |
| JP | 2006-309280 A | 11/2006 |
| JP | 2008-76234 A | 4/2008 |
| JP | 2009-134688 A | 6/2009 |
| JP | 2009-265830 A | 11/2009 |
| JP | 2010-231629 A | 10/2010 |
| JP | 2011-248836 A | 12/2011 |
| JP | 2011-254289 A | 12/2011 |
| JP | 2012-203680 A | 10/2012 |
| JP | 5597762 B1 | 10/2014 |
| JP | 5597781 B1 | 10/2014 |
| JP | 5683663 B1 | 3/2015 |
| JP | 2015-149557 A | 8/2015 |
| JP | 2015-149558 A | 8/2015 |
| JP | 2015-149559 A | 8/2015 |
| JP | 2016-015540 A1 | 1/2016 |
| JP | 2016-015579 A | 1/2016 |
| JP | 5838371 B1 | 1/2016 |
| WO | 2010/044186 A1 | 4/2010 |
| WO | 2013/072401 A2 | 5/2013 |

OTHER PUBLICATIONS

U.S. Appl. No. 15/040,687, filed Feb. 10, 2016, Flow Line Analysis System and Flow Line Analysis Method.
U.S. Appl. No. 15/099,352, filed Apr. 14, 2016, Flow Line Analysis System and Flow Line Analysis Method.
U.S. Appl. No. 15/536,572, filed Jun. 15, 2017, Flow Line Analysis System and Flow Line Display Method.
Final Office Action, dated Apr. 26, 2018, for U.S. Appl. No. 15/040,687, 15 pages.
Final Office Action, dated Dec. 20, 2018 for U.S. Appl. No. 15/099,352, 20 pages.
Final Office Action, dated Feb. 7, 2019, for U.S. Appl. No. 15/536,572, 9 pages.
Final Office Action, dated Mar. 20, 2019, for U.S. Appl. No. 15/040,687, 20 pages.
International Search Report, dated Jul. 5, 2016, for International Application No. PCT/JP2016/002063, 9 pages.

(56) References Cited

OTHER PUBLICATIONS

Mobotix, "An innovative monitor camera MOBOTIX Q24, 360° coverage can be monitored by only one camera never seen before," [online], OPN Corporation, 2014, retrieved on Jun. 16, 2014, 13 pages.
Non-Final Office Action, dated Oct. 3, 2017, for U.S. Appl. No. 15/040,687, 32 pages.
Non-Final Office Action, dated May 22, 2018, for U.S. Appl. No. 15/099,352, 23 pages.
Non-Final Office Action, dated Aug. 23, 2018, for U.S. Appl. No. 15/536,572, 9 pages.
Non-Final Office Action, dated Sep. 10, 2018, for U.S. Appl. No. 15/040,687, 19 pages.
Non-Final Office Action, dated May 31, 2019, for U.S. Appl. No. 15/099,352, 23 pages.
Non-Final Office Action, dated Jun. 13, 2019, for U.S. Appl. No. 15/536,572, 9 pages.

\* cited by examiner

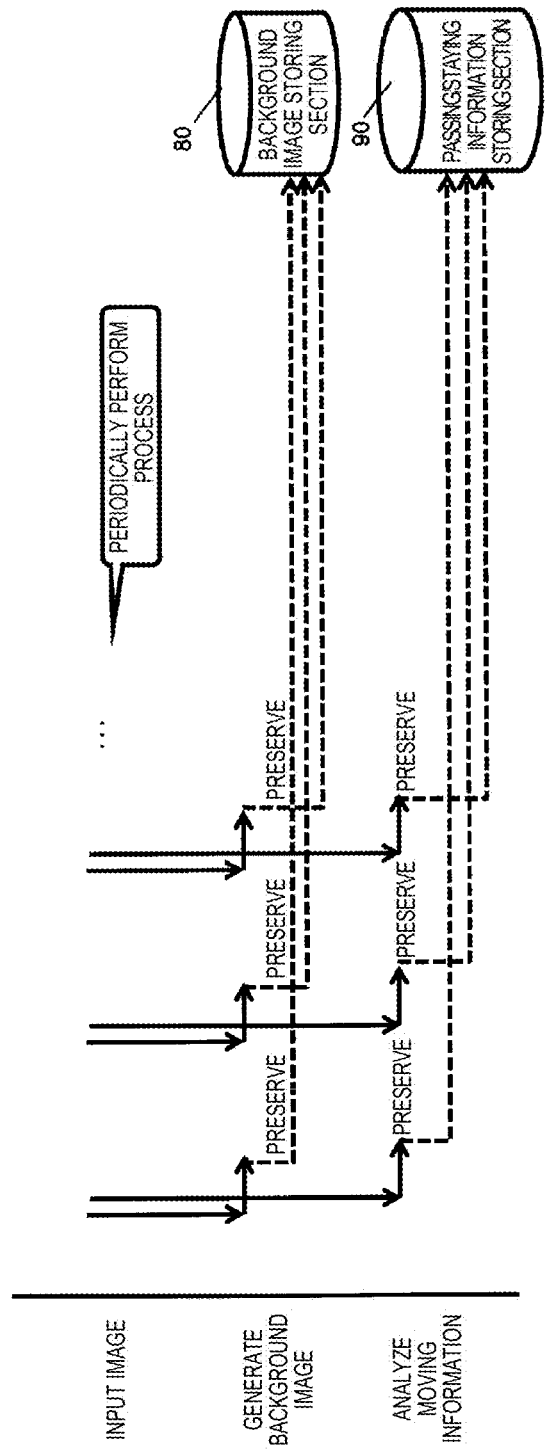

FIG. 12

MOVING INFORMATION ANALYZING SYSTEM AND MOVING INFORMATION ANALYZING METHOD

BACKGROUND

1. Technical Field

The present disclosure relates to a moving information analyzing system and a moving information analyzing method capable of generating a moving information analysis image in which staying information or passing information of a person is superimposed on an image captured by a camera.

2. Description of the Related Art

As the related art in which a level of activity of a person over a period of time at an imaging site where a camera is provided is displayed as a heat map image, for example, Japanese Patent Unexamined Publication No. 2009-134688 is known.

Japanese Patent Unexamined Publication No. 2009-134688 discloses a technique of analyzing moving information of a person at the imaging site where a security camera connected to a network is provided so as to calculate a level of activity, generating a heat map image in which a detection result from a sensor is superimposed on a floor plan of the imaging site, and displaying the heat map image on a browser screen corresponding to the security camera. Consequently, it is possible to understand a level of activity of the person at the imaging site by viewing the heat map image displayed on the browser screen.

There has been the proposal of a technique of generating and displaying a heat map image in which moving information density of persons or a detection result of the number of people is superimposed on an image captured by a camera unlike the floor plan disclosed in the above document.

Here, in a case where a detection result from a sensor is superimposed on the floor plan in the above document, it is necessary to accurately match the floor plan with an image of the imaging site captured by the security camera, but, in this document, the floor plan is not changed and is thus invariable. Therefore, the image matches the floor plan only in a case where arrangement at the imaging site is not changed from the time of creating the floor plan serving as a basis of the heat map image.

Here, a case is assumed in which a camera captures an image of a predetermined imaging region (for example, a location set in advance in a store), and a layout regarding arrangement of merchandise shelves in the store is changed. When a heat map image in which staying information or passing information of a person is superimposed on an image captured by the camera is generated, if a layout in the store is changed, staying information or passing information of a person obtained before the change does not match an image captured by the camera after the change, and thus a heat map image on which accurate staying information or passing information is superimposed cannot be obtained.

Thus, in Japanese Patent Unexamined Publication No. 2009-134688, when the layout in the store is changed, a floor plan of the layout is required to be changed, an image serving as a basis of a heat map image is an image obtained through imaging in the camera, and thus a person is reflected in the image. Therefore, there is a problem in that privacy of the person is not correctly protected.

SUMMARY

In order to solve the above-described problem of the related art, an object of the present disclosure is to provide a moving information analyzing system and a moving information analyzing method, in which privacy of a person reflected in an imaging region is appropriately protected, an accurate moving information analysis image in which staying information or passing information of a person is superimposed on a background image updated at a predetermined timing is generated, and a change in the moving information analysis image can be checked with a simple operation.

According to the present disclosure, there is provided a moving information analyzing system including a plurality of cameras; and a server that is connected to the cameras, in which each of the cameras generates a background image of an imaging region captured by the camera, extracts moving information regarding a staying position or a passing position of a moving object in the imaging region of the camera, and transmits the background image and moving information of the moving object in a specific period to the server in response to a transmission request from the server or an input device connected to the server, and in which, in a case where a first moving information analysis image in which moving information of a moving object in an imaging region of a first camera is superimposed on the background image transmitted from the first camera among the plurality of cameras is generated and displayed on a monitor, the server generates a second moving information analysis image in which moving information of a moving object in an imaging region of the second camera is superimposed on the background image transmitted from a second camera which is different from the first camera among the plurality of cameras in response to a camera switching operation, and displays the second moving information analysis image on the monitor. According to the present disclosure, there is provided a moving information analyzing system including a plurality of cameras; and a server that is connected to a camera, in which the camera generates a background image of an imaging region obtained by imaging the imaging region, extracts moving information regarding a staying position or a passing position of a moving object in the imaging region, and transmits the background image and moving information of the moving object in a specific period to the server in response to a transmission request from the server or an input device connected to the server, and in which the server generates a first moving information analysis image in which moving information of a moving object in a first predetermined period in the imaging region of the camera is superimposed on a background image in the first period as a part of the specific period, transmitted from the camera, and displays the first moving information analysis image on a monitor, and generates a second moving information analysis image in which moving information of a moving object in a second predetermined period subsequent to the first predetermined period in the imaging region of the camera is superimposed on a background image in the second predetermined period of the specific period, transmitted from the camera in response to a continuous reproduction operation, and displays the second moving information analysis image on the monitor.

According to the present disclosure, it is possible to appropriately protect privacy of a person reflected in an imaging region, to generate an accurate moving information analysis image in which staying information or passing information of a person is superimposed on a background image updated at a predetermined timing, and to check a change in the moving information analysis image with a simple operation.

BRIEF DESCRIPTION OF THE DRAWINGS

FIG. 5 is a time chart illustrating operation timings of respective processes including image input, background image generation, and moving information analysis in the camera of the present exemplary embodiment;

FIG. 12 is a diagram illustrating an example of an operation screen of a monthly report related to a food sales area of the store, dated in May, 2014, generated by a report generating output section of the server of the present exemplary embodiment;

DETAILED DESCRIPTION

Hereinafter, a description will be made of an exemplary embodiment (hereinafter, referred to as the "present exemplary embodiment") in which a moving information analyzing system and a moving information analyzing method according to the present disclosure are specifically disclosed with reference to the drawings. However, a detailed description more than necessary will be omitted in some cases. For example, a detailed description of the well-known content or a repeated description of the substantially same configuration will be omitted in some cases. This is so that a person skilled in the art can easily understand the present disclosure by preventing the following description from being unnecessarily redundant. The accompanying drawings and the following description are provided in order for a person skilled in the art to fully understand the present disclosure, and are not intended to limit the subject matter recited in the claims. The present disclosure may be expressed as a moving information analysis image generation method including operations (steps) of a camera generating a moving information analysis image (which will be described later).

Figure 1:
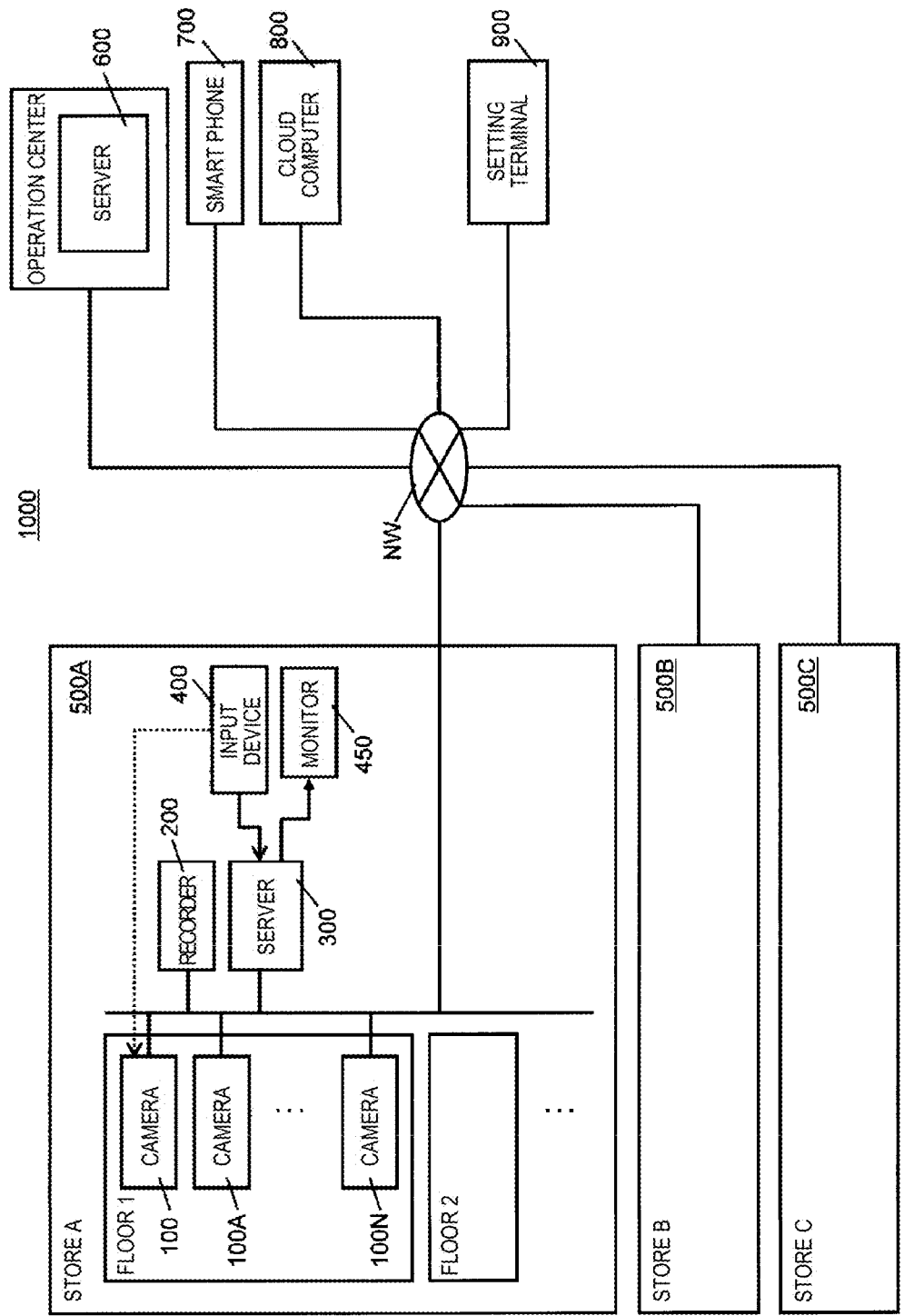
FIG. 1 is a system configuration diagram illustrating details of a configuration of a sales management system including a moving information analyzing system of the present exemplary embodiment.

In the following present exemplary embodiment, as illustrated in FIG. 1, a description thereof will be made, for example, assuming use of sales management system 1000 in which moving information analyzing systems 500A, 500B, 500C, . . . related to the present disclosure are respectively provided in a plurality of stores (store A, store B, store C, . . . ), and the plurality of moving information analyzing systems 500A, 500B, 500C, . . . are connected to each other via network NW. However, exemplary embodiments of the moving information analyzing system, a camera, and a moving information analyzing method related to the present disclosure are not limited to content to be described later.

FIG. 1 is a system configuration diagram illustrating details of a configuration of sales management system 1000 including moving information analyzing systems 500A, 500B, 500C, . . . of the present exemplary embodiment. Sales management system 1000 illustrated in FIG. 1 includes moving information analyzing systems 500A, 500B, 500C, . . . which are respectively provided in a plurality of stores A, B, C, . . . , server 600 of an operation center, smart phone 700, cloud computer 800, and setting terminal 900.

Respective moving information analyzing systems 500A, 500B, 500C, . . . , server 600 of the operation center, smart phone 700, cloud computer 800, and setting terminal 900 are connected to each other via network NW. Network NW is wireless network or a wired network. The wireless network is, for example, a wireless local area network (LAN), a wireless wide area network (WAN), 3G, long term evolution (LTE), or wireless gigabit (WiGig). The wired network is, for example, an intranet or the Internet.

Moving information analyzing system 500A provided in store A includes a plurality of cameras 100, 100A, . . . , and 100N provided in floor 1, recorder 200, server 300, input device 400, and monitor 450 illustrated in FIG. 1. In the same manner as in floor 1, a plurality of cameras are provided in floor 2, and the cameras in floor 2 are not illustrated. Internal configurations of respective cameras 100, 100A, . . . , and 100N are the same as each other, and details thereof will be described later with reference to FIG. 2.

Recorder 200 is configured by using, for example, a semiconductor memory or a hard disk device, and stores data on an image captured by each of the cameras provided in store A (hereinafter, the image captured by the camera is referred to as a "captured image"). The data on the captured image stored in recorder 200 is provided for monitoring work such as crime prevention.

Server 300 is configured by using, for example, a personal computer (PC), and notifies camera 100 of the occurrence of a predetermined event (for example, a change of a layout of a sales area of floor 1 of store A) in response to an input operation performed by a user (who is a user of, for example, the moving information analyzing system and indicates a salesperson or a store manager of store A; this is also the same for the following description) who operates input device 400.

Server 300 generates a moving information analysis image in which moving information regarding a staying position or a passing position of a moving object (for example, a person such as a salesperson, a store manager, or a store visitor; this is also the same for the following description) in an imaging region of the camera (for example, camera 100) on a captured image obtained by the camera (for example, camera 100) by using data (which will be described later) transmitted from the camera (for example, camera 100), and displays the image on monitor 450.

Server 300 performs a predetermined process (for example, a process of generating a moving information analysis report which will be described later) in response to an input operation performed by the user operating input device 400, and displays the moving information analysis report on monitor 450. Details of an internal configuration of server 300 will be described later with reference to FIG. 2.

Input device 400 is configured by using, for example, a mouse, a keyboard, a touch panel, or a touch pad, and outputs a signal corresponding to a user's input operation to camera 100 or server 300. In FIG. 1, for simplification of illustration, an arrow is shown only between input device 400 and camera 100, but arrows may be shown between input device 400 and other cameras (for example, cameras 100A and 100N).

Monitor 450 is configured by using, for example, a liquid crystal display (LCD) or an organic electroluminescence (EL) display, and displays data related to a moving information analysis image or a moving information analysis report generated by server 300. Monitor 450 is provided as an external apparatus separately from server 300, but may be included in server 300.

Server 600 of the operation center is a viewing apparatus which acquires and displays moving information analysis images or moving information analysis reports generated by moving information analyzing systems 500A, 500B, 500C, . . . provided in the respective stores A, B, C, . . . in response to an input operation performed by an employee (for example, an officer) of the operation center who operates server 600 of the operation center. Server 600 of the operation center holds various information pieces (for example, sales information, information regarding the number of visitors, event schedule information, the highest atmospheric temperature information, and the lowest atmospheric temperature information) required to generate a moving information analysis report (refer to FIG. 12). These various information pieces may be held in the servers provided in respective stores A, B, C, . . . . Server 600 of the operation center may perform each process which is performed by the server (for example, server 300 of store A) provided in each of stores A, B, C, . . . . Consequently, server 600 of the operation center can integrate data from the respective stores A, B, C, . . . so as to generate a moving information analysis report (for example, refer to FIG. 12 to be described later) and thus to acquire specific data (for example, a moving information analysis report illustrated in FIG. 12) related to one store selected through an input operation on server 600 of the operation center, or to display a data comparison result between specific sales areas (for example, meat sales areas) of a plurality of stores.

Smart phone 700 is a viewing apparatus which acquires and displays moving information analysis images or moving information analysis reports generated by moving information analyzing systems 500A, 500B, 500C, . . . provided in the respective stores A, B, C, . . . in response to an input operation performed by an employee (for example, a sales representative) of the operation center who operates smart phone 700.

The cloud computer 800 is an online storage which stores data related to moving information analysis images or moving information analysis reports generated by moving information analyzing systems 500A, 500B, 500C, . . . provided in the respective stores A, B, C, . . . , and performs a predetermined process (for example, retrieval and extraction of a moving information analysis report dated on the Y-th day of the X month) in response to in response to an input operation performed by an employee (for example, a sales representative) of the operation center who operates smart phone 700 and displays a process result on smart phone 700.

Setting terminal 900 is configured by using, for example, a PC, and can execute dedicated browser software for displaying a setting screen of the camera of moving information analyzing systems 500A, 500B, 500C, . . . provided in the respective stores A, B, C, . . . . Setting terminal 900 displays a setting screen (for example, a common gateway interface (CGI)) of the camera by using the browser software in response to an input operation of an employee (for example, a system manager of sales management system 1000) of the operation center operating setting terminal 900, and sets information regarding the camera by editing (correcting, adding, and deleting) the information.

Camera

Figure 2:
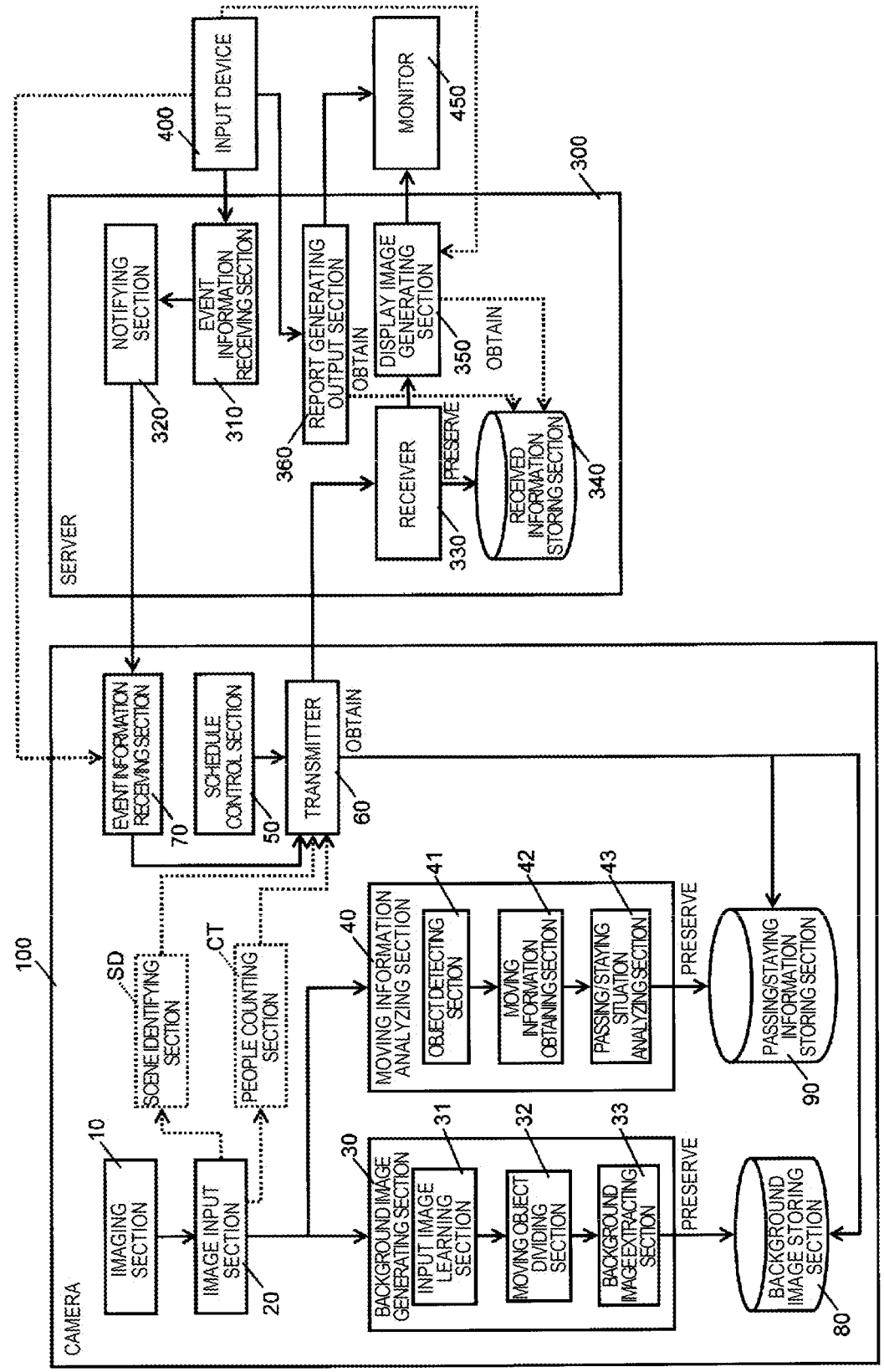
FIG. 2 is a block diagram illustrating details of a functional internal configuration of each of a camera and a server of the present exemplary embodiment.

FIG. 2 is a block diagram illustrating details of a functional internal configuration of each of camera 100 and server 300 of the present exemplary embodiment. In sales management system 1000 illustrated in FIG. 1, the cameras provided in the respective stores A, B, C, . . . have the same configuration, and thus camera 100 will be described as an example in FIG. 2.

Camera 100 illustrated in FIG. 2 includes imaging section 10, image input section 20, background image generating section 30, moving information analyzing section 40, schedule control section 50, transmitter 60, event information receiving section 70, background image storing section 80, and passing/staying information storing section 90. Background image generating section 30 includes input image learning section 31, moving object dividing section 32, and background image extracting section 33. Moving information analyzing section 40 includes object detecting section 41, moving information obtaining section 42, and passing/staying situation analyzing section 43.

Imaging section 10 includes at least a lens and an image sensor. The lens collects light (light beams) which is incident from the outside of camera 100 and forms an image on an imaging surface of the image sensor. As the lens, a fish-eye lens, or a wide angle lens which can obtain an angle of view of 140 degrees or greater is used. The image sensor is a solid-state imaging element such as a charge-coupled device (CCD) or a complementary metal oxide semiconductor (CMOS), and converts an optical image formed on the imaging surface into an electric signal.

Image input section 20 is configured by using, for example, a central processing unit (CPU), a micro-processing unit (MPU), or a digital signal processor (DSP), and performs a predetermined signal process using the electric signal from imaging section 10 so as to generate data (frame) for a captured image defined by red, green, and blue (RGB) or YUV (luminance and color difference) which can be recognized by the human eye, and outputs the data to background image generating section 30 and moving information analyzing section 40.

Background image generating section 30 is configured by using, for example, a CPU, an MPU, or a DSP, and generates a background image obtained by removing a moving object (for example, a person) included in the captured image for every data item (frame) for the captured image output from image input section 20 at a predetermined frame rate (for example, 30 frames per second (fps)), and preserves the background image in background image storing section 80. The process of generating a background image in background image generating section 30 may employ an image processing method disclosed in, for example, Japanese Patent Unexamined Publication No. 2012-203680, but is not limited to this method.

Figure 3:
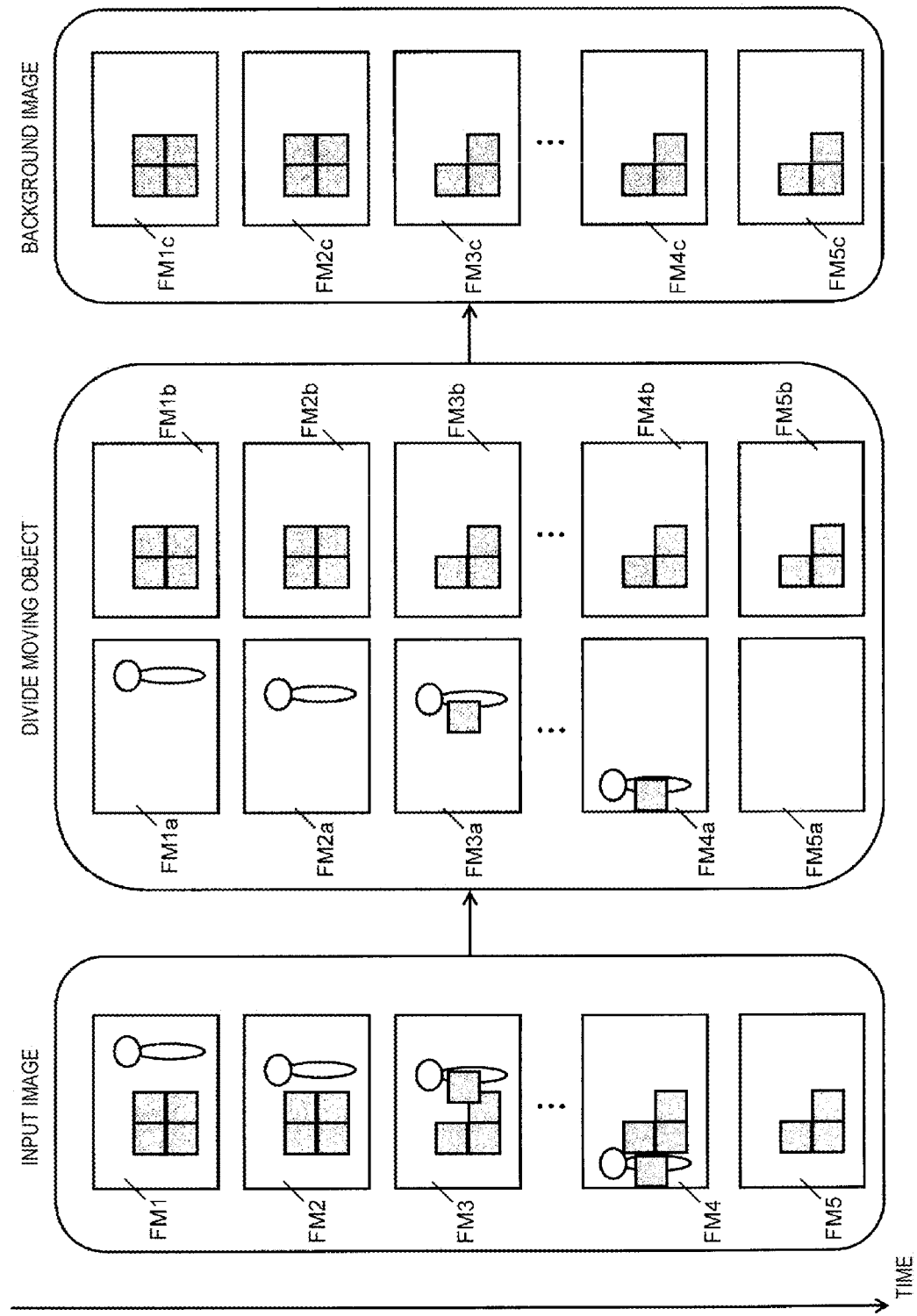
FIG. 3 is a diagram illustrating a summary of an operation of a background image generating section of the camera of the present exemplary embodiment.

Here, a summary of an operation of background image generating section 30 will be described briefly with reference to FIGS. 3 to 4B. FIG. 3 is a diagram illustrating a summary of an operation of background image generating section 30 of camera 100 according to the present exemplary embodiment. FIG. 4A is a diagram illustrating an example of a captured image which is input to image input section 20.

Figure 4B:
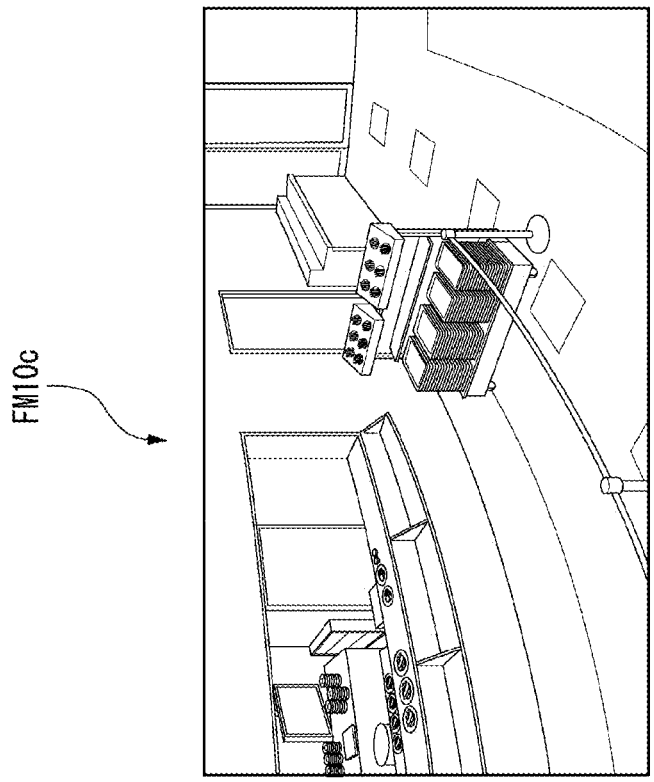
FIG. 4B is a diagram illustrating an example of a background image generated by the background image generating section.
Figure 4A:
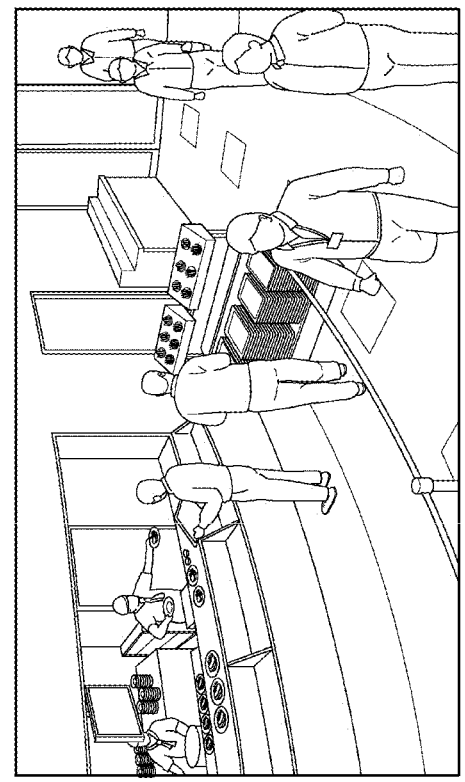
FIG. 4A is a diagram illustrating an example of a captured image which is input into an image input section.

FIG. 4B is a diagram illustrating an example of a background image generated by background image generating section 30.

FIG. 3 schematically illustrates results generated by input image learning section 31, moving object dividing section 32, and background image extracting section 33 from the left side to the right side of the figure perpendicular to a time axis which is directed from the top to the bottom of the figure, and illustrates a state in which a visitor to the store carries one corrugated cardboard among four corrugated cardboards for drinks.

Input image learning section 31 analyzes the distribution of luminance and color difference in each pixel in frames (for example, respective frames FM1 to FM5 illustrated in FIG. 3) of a plurality of captured images output from image input section 20.

Moving object dividing section 32 divides the respective frames FM1 to FM5 of the captured images into information (for example, refer to frames FM1a to FM5a) regarding a moving object (for example, a person) and information (for example, refer to frames FM1b to FM5b) regarding a portion (for example, a background) other than the moving object, by using a result (that is, an analysis result of the distribution situation of the luminance and the color difference in each pixel of the plurality of frames (for example, in the time axis direction illustrated in FIG. 3)) of input image learning section 31. In the frames FM3 and FM4 of the captured images showing a state in which the person as a moving object carries the corrugated cardboard, values of luminance and color differences corresponding to pixels of the corrugated cardboard carried by the person change in the time axis direction (for example, refer to FIG. 3), and thus moving object dividing section 32 regards the corrugated cardboard carried by the person as a moving object.

Background image extracting section 33 extracts frames FM1b to FM5b in which the information regarding the portion other than the moving object is shown among the information pieces divided by moving object dividing section 32, as frames FM1c to FM5c for background images corresponding to frames FM1 to FM5 of the captured images output from image input section 20, and preserves the frames in background image storing section 80.

In frame FM10a of a captured image illustrated in FIG. 4A, for example, a person providing food and a person receiving the food on a tray in a restaurant are shown as moving objects. In contrast with frame FM10a of the captured image illustrated in FIG. 4A, in frame FM10c (refer to FIG. 4B) of a background image generated by background image generating section 30, the person providing the food and the person receiving the food as moving objects in the same restaurant are removed so that neither of the two persons are shown.

Moving information analyzing section 40 is configured by using, for example, a CPU, an MPU, or a DSP, and detects moving information regarding a staying position or a passing position of a moving object (for example, a person) included in the captured image for every data item (frame) regarding the captured image output from image input section 20 at a predetermined frame rate (for example, 10 fps), and preserves the background image in passing/staying information storing section 90.

Object detecting section 41 performs a process image process (for example, a person detection process or a face detection process) on a frame of a captured image output from image input section 20 so as to detect the presence or absence of a moving object (for example, a person) included in the frame of the captured image. In a case where a moving object included in the frame of the captured image is detected, object detecting section 41 outputs information (for example, frame coordinate information) regarding a detection region of the moving object in the frame of the captured image, to moving information obtaining section 42. In a case where a moving object included in the frame of the captured image is not detected, object detecting section 41 outputs information (for example, predetermined null information) regarding a detection region of the moving object, to moving information obtaining section 42.

Moving information obtaining section 42 associates the present and past information pieces regarding the detection region with each other by using the information regarding the captured image output from image input section 20 and the past information (for example, captured image information or coordinate information) regarding the detection region of the moving object on the basis of the information regarding the detection region of the moving object output from object detecting section 41, and outputs the association result to passing/staying situation analyzing section 43 as moving information (for example, an amount of change in the coordinate information of the detection region of the moving object).

Passing/staying situation analyzing section 43 extracts and generates, from a plurality of captured images, moving information (for example, "object position information", "moving information", and "information regarding a passing situation or a staying situation") regarding a staying position or a passing position of the moving object (for example, a person) in the frame of the captured image on the basis of the moving information output from moving information obtaining section 42. Passing/staying situation analyzing section 43 may generate a color portion visualizing image of a moving information analysis image (heat map image) generated in display image generating section 350 of server 300 by using the extraction result of the moving information regarding the staying position or the passing position of the moving object (for example, a person).

By using moving information for frames of a plurality of captured images, passing/staying situation analyzing section 43 can extract and generate accurate moving information regarding a position where a moving object (for example, a person) stays or passes from the frames of the captured images which are output from image input section 20.

Schedule control section 50 is configured by using, for example, a CPU, an MPU, or a DSP, and gives, to transmitter 60, an instruction for a predetermined transmission cycle for periodically transmitting, to server 300, the background image data preserved in background image storing section 80 and the extraction result data of the moving information regarding the staying information or the passing information of the moving object preserved in passing/staying information storing section 90. The predetermined transmission cycle is, for example, 15 minutes, an hour, 12 hours, or 24 hours, and is not limited to such intervals.

Transmitter 60 obtains and transmits the background image data preserved in background image storing section 80 and the extraction result data of the moving information regarding the staying information or the passing information of the moving object preserved in passing/staying information storing section 90 to server 300 in response to the instruction from schedule control section 50 or event information receiving section 70. Transmission timing in transmitter 60 will be described later with reference to FIGS. 5 to 8.

Event information receiving section 70 as an example of an event information obtaining section receives (obtains) a notification of detection of a predetermined event (for example, a change of a layout of a sales area of floor 1 of store A) from server 300 or input device 400, and outputs, to transmitter 60, an instruction for transmitting, to server 300, the background image data preserved in background image storing section 80 and the extraction result data of the moving information regarding the staying information or the passing information of the moving object preserved in passing/staying information storing section 90 when receiving the notification of detection of the predetermined event.

Background image storing section 80 is configured by using, for example, a semiconductor memory or a hard disk device, and stores the data (frame) regarding the background image generated by background image generating section 30.

Passing/staying information storing section 90 is configured by using, for example, a semiconductor memory or a hard disk device, and stores the extraction result data (for example, "object position information", "moving information", and "information regarding a passing situation or a staying situation") of the moving information regarding the staying position or the passing position of the moving object (for example, a person), generated by moving information analyzing section 40.

Camera 100 illustrated in FIG. 2 may be provided with scene identifying section SD which performs an operation as follows (for example, refer to FIG. 13) instead of event information receiving section 70. Scene identifying section SD as an example of an image change detecting section determines whether or not there is a change (for example, an event such as a change of a layout of a sales area of floor 1 of store A) in a captured image output from image input section 20. In a case where a change in the captured image is detected, scene identifying section SD outputs, to transmitter 60, an instruction for transmitting, to server 300, the background image data preserved in background image storing section 80 and the extraction result data of the moving information regarding the staying information or the passing information of the moving object preserved in passing/staying information storing section 90.

Camera 100 illustrated in FIG. 2 may be further provided with people counting section CT which performs an operation as follows (for example, refer to FIG. 13). People counting section CT as an example of a moving object detecting section performs a predetermined image process (for example, a person detecting process) on a captured image output from image input section 20 so as to count the number of detected moving objects included in the captured image to transmitter 60. People counting section CT outputs information regarding the number of detected moving objects included in the captured image to transmitter 60.
Server Server 300 illustrated in FIG. 2 includes event information receiving section 310, notifying section 320, receiver 330, received information storing section 340, display image generating section 350, and report generating output section 360.

In a case where information indicating that a predetermined event (for example, a change of a layout of a sales area of floor 1 of store A) has occurred for each corresponding camera (for example, camera 100) is input from input device 400, event information receiving section 310 receives a notification of detection of the predetermined event. Event information receiving section 310 outputs information indicating that the notification of detection of the predetermined event has been received, to notifying section 320. The information indicating that a predetermined event has occurred includes an identification number (for example, C1, C2, . . . which will be described later) of the camera which images a location where the predetermined event has occurred as an imaging region.

Notifying section 320 transmits the notification of detection of the predetermined event, output from event information receiving section 310, to a corresponding camera (for example, camera 100).

Receiver 330 receives the data (that is, the background image data preserved in background image storing section 80 and the extraction result data of the moving information regarding the staying information or the passing information of the moving object preserved in passing/staying information storing section 90) transmitted from transmitter 60 of camera 100, and outputs the data to received information storing section 340 and display image generating section 350.

Received information storing section 340 is configured by using, for example, a semiconductor memory or a hard disk device, and stores the data (that is, the background image data preserved in background image storing section 80 and the extraction result data of the moving information regarding the staying information or the passing information of the moving object preserved in passing/staying information storing section 90) received by receiver 330.

Display image generating section 350 as an example of an image generating section is configured by using, for example, a CPU, an MPU, or a DSP, and generates a moving information analysis image in which the moving information regarding the staying position and the passing position of the moving object on the background image by using the data (that is, the background image data preserved in background image storing section 80 and the extraction result data of the moving information regarding the staying information or the passing information of the moving object preserved in passing/staying information storing section 90) is obtained from receiver 330 or received information storing section 340.

The moving information analysis image is an image in which the moving information visually indicating a location at which a moving object stays or a location through which the moving object passes is quantitatively visualized within a predetermined range (for example, values of 0 to 255) such as in a heat map in an imaging region corresponding to a captured image on the background image obtained by removing the moving object (for example, a person) which thus is not shown from the captured image acquired by camera 100. Display image generating section 350 as an example of a display control section displays the generated moving information analysis image on monitor 450.

Report generating output section 360 as an example of a report generating section is configured by using, for example, a CPU, an MPU, or a DSP, and generates a moving information analysis report (for example, refer to FIG. 12) which will be described later in a case where an instruction for generating the moving information analysis report is input from input device 400. Report generating output section 360 as an example of a display control section displays the generated moving information analysis report on monitor 450.

Process of Transmitting Data from Camera to Server

Figure 6:
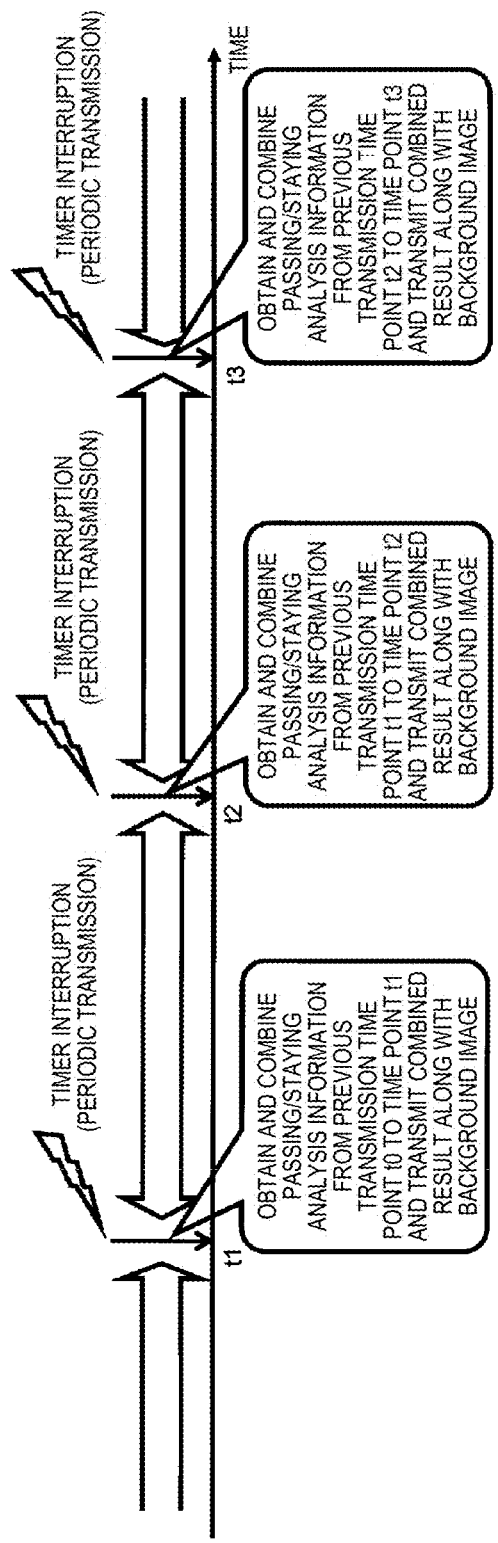
FIG. 6 is a time chart corresponding to a case where the camera of the present exemplary embodiment periodically performs a transmission process.
Figure 7:
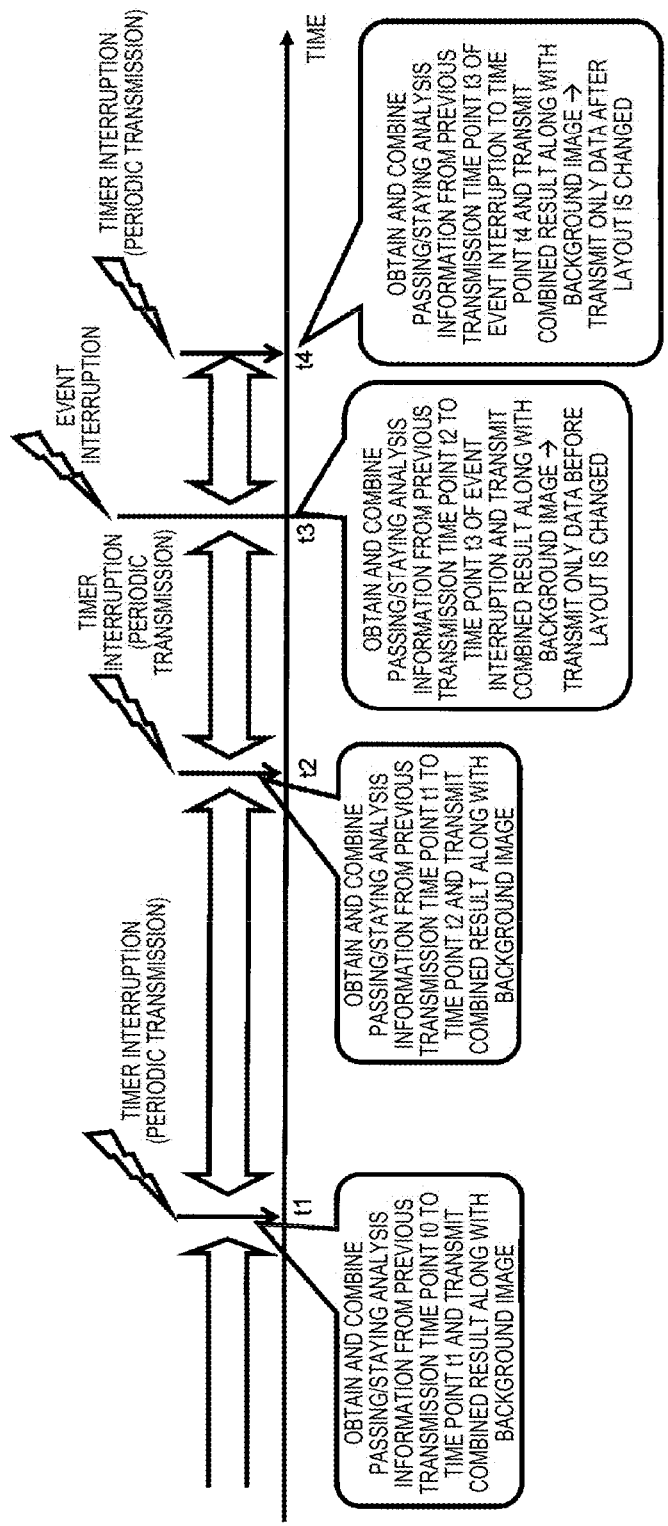
FIG. 7 is a time chart corresponding to a case where the camera of the present exemplary embodiment changes an operation timing of the transmission process in response to detection of an event.
Figure 8:
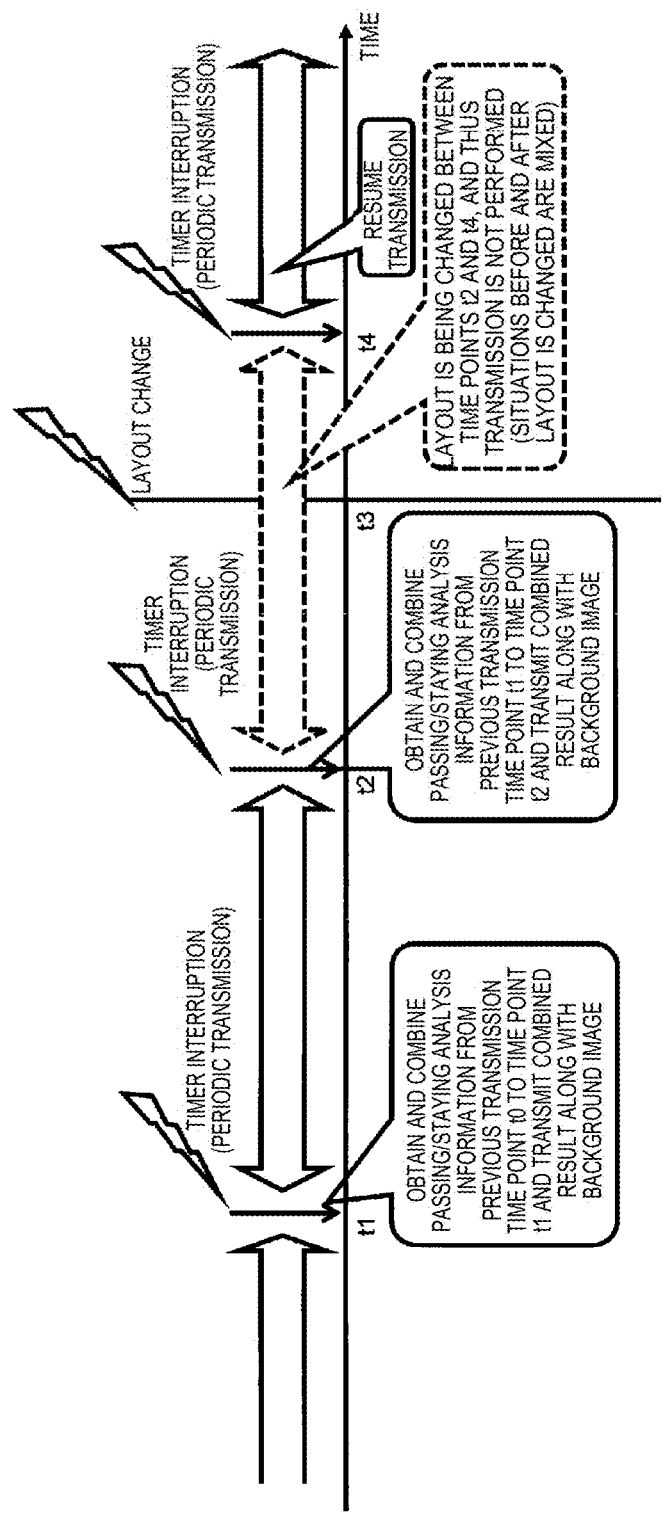
FIG. 8 is a time chart corresponding to a case where the camera of the present exemplary embodiment omits the transmission process before and after an event is detected.

Next, with reference to FIGS. 5 to 8, a description will be made of a process of transmitting data from camera 100 to server 300. FIG. 5 is a time chart illustrating operation timings of a transmission process in camera 100 of the present exemplary embodiment. FIG. 6 is a time chart corresponding to a case where camera 100 of the present exemplary embodiment periodically performs the transmission process. FIG. 7 is a time chart corresponding to a case where camera 100 of the present exemplary embodiment changes an operation timing of the transmission process in response to detection of an event. FIG. 8 is a time chart corresponding to a case where camera 100 of the present exemplary embodiment omits the transmission process before and after an event is detected.

In FIG. 5, in camera 100, if a captured image is output from image input section 20 (image input), background image generating section 30 generates a background image of the captured image output from image input section 20 (background image generation) and preserves the background image in background image storing section 80, and moving information analyzing section 40 extracts moving information regarding a staying position or a passing position of a moving object (for example, a person) included in the captured image output from image input section 20 (moving information analysis). The respective processes such as the image input, the background image generation, and the moving information analysis are periodically and repeatedly performed. However, if the respective processes such as the image input, the background image generation, and the moving information analysis are periodically and repeatedly performed, intervals between the respective processes may not be the same as each other.

For example, after the initial respective processes such as the image input, the background image generation, and the moving information analysis illustrated in FIG. 5 are performed, for example, as illustrated in FIG. 7, at an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t0 to present transmission time point t1, and transmits the data to server 300 (time point t1). As described above, a periodic transmission interval (transmission cycle) in transmitter 60 is 15 minutes, an hour, 12 hours, 24 hours, or the like, and an instruction therefor is given by schedule control section 50 in advance. The background image data transmitted by transmitter 60 may be data corresponding to a single background image or may be data corresponding to a plurality of background images (for example, a plurality of background images obtained at intervals of five minutes).

Next, when the second and subsequent respective processes such as the inputting of the image input, the background image generation, and the moving information analysis illustrated in FIG. 5 are performed, for example, as illustrated in FIG. 7, at an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t1 to present transmission time point t2, and transmits the data to server 300 (time point t2).

For example, as illustrated in FIG. 7, if a notification of detection of a predetermined event (for example, a change of a layout of a sales area of floor 1 of store A) is received from event information receiving section 70 (time point t3), transmitter 60 receives, for example, event interruption from event information receiving section 70, obtains the background image data preserved in background image storing section 80 and the extraction result data of the moving information regarding the staying information or the passing information of the moving object preserved in passing/staying information storing section 90 from previous transmission time point t2 to present transmission time point t3, and transmits the data to server 300 (time point t3). A transmission process in transmitter 60 may be performed by using not only the method illustrated in FIG. 7 but also either of the methods illustrated in FIGS. 6 and 8.

In FIGS. 6 to 8, description of the same content as that of the transmission process illustrated in FIG. 5 will be made briefly or omitted, and different content will be described. Specifically, in FIG. 6, even if event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 to present transmission time point t3 to server 300 (time point t3).

However, in the transmission process illustrated in FIG. 6, in a case where a predetermined event occurs from time point t2 to time point t3, since content of a captured image is updated, different background images are used together before and after the event is detected, and thus there is a possibility that the content of a moving information analysis image may not be accurate.

Therefore, in FIG. 7, if a notification of detection of a predetermined event (for example, a change of a layout of a sales area of floor 1 of store A) from event information receiving section 70 (time point t3), transmitter 60 receives, for example, event interruption from event information receiving section 70, obtains the background image data preserved in background image storing section 80 and the extraction result data of the moving information regarding the staying information or the passing information of the moving object preserved in passing/staying information storing section 90 from previous transmission time point t2 to present transmission time point t3 at which the event interruption is received, and transmits the data to server 300 (time point t3). At an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t3 at which the event interruption is received to present transmission time point t4, and transmits the data to server 300 (time point t4).

In FIG. 8, even if event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 to present transmission time point t3 at which the event interruption is received to server 300 (time point t3). At an end point of a transmission cycle for which an instruction is given by schedule control section 50, transmitter 60 receives, for example, timer interruption from schedule control section 50, and does not transmit the background image data preserved in background image storing section 80 and the extraction result data of the moving information regarding the staying information or the passing information of the moving object preserved in passing/staying information storing section 90 from previous transmission time point t3 at which the event interruption is received to present transmission time point t4, and transmits the data to server 300 (time point t4).

In other words, in a case where the event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 up to a start point (t4 in FIG. 8) of a transmission cycle after the event interruption is received, to server 300 (from time point t2 to time point t4).

In FIG. 8, for example, if timer interruption is received from schedule control section 50 (time point t4), transmitter 60 resumes transmission of the background image data preserved in background image storing section 80 and the extraction result data of the moving information regarding the staying information or the passing information of the moving object preserved in passing/staying information storing section 90 to server 300. Specifically, although not illustrated in FIG. 8, at an end point of a transmission cycle for which an instruction is given by schedule control section 50 after time point t4, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from time point t4 to the present transmission time point, and transmits the data to server 300.

Figure 9:
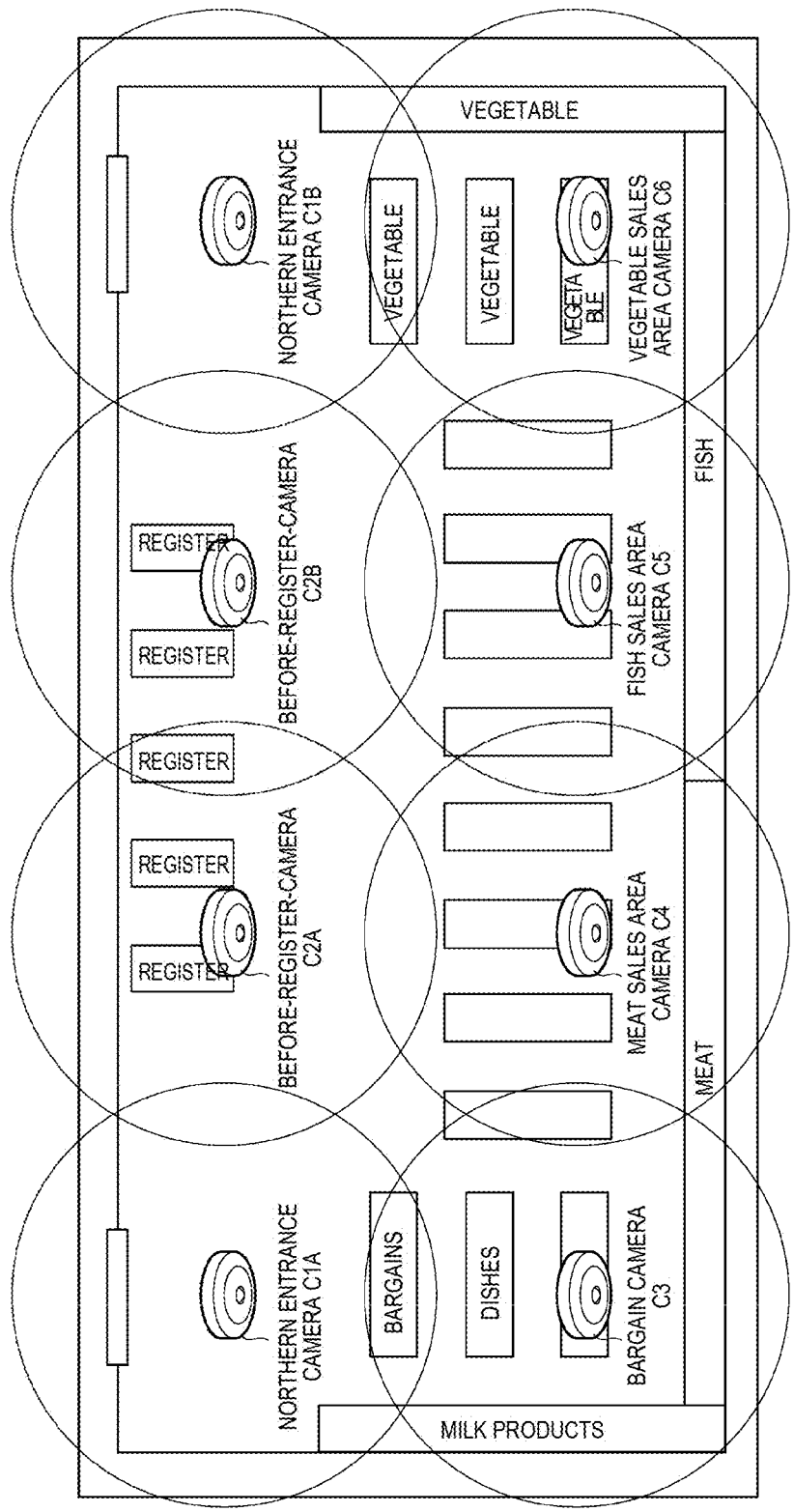
FIG. 9 is a diagram illustrating an example of a layout of a food sales area in which the camera of the present exemplary embodiment is provided in a plurality.

FIG. 9 is a diagram illustrating an example of a layout of a food sales area where camera 100 of the present exemplary embodiment is provided in plurality. FIG. 9 illustrates a state in which, for example, in the food sales area of floor 1 (1F) of store A, a plurality of (for example, eight) cameras are provided on a ceiling surface of floor 1. Specifically, a total of eight cameras (for example, omnidirectional cameras) including northern entrance cameras C1A and C1B, before-register-cameras C2A and C2B, bargain camera C3, meat sales area camera C4, fish sales area camera C5, and vegetable sales area camera C6 are provided. The type of camera is not limited to the omnidirectional camera, and may be a fixed camera in which a fixed angle of view is set, or may be a PTZ (pan, tilt, and zoom) camera having a panning function, a tilting function, and a zooming function.

Figure 10:
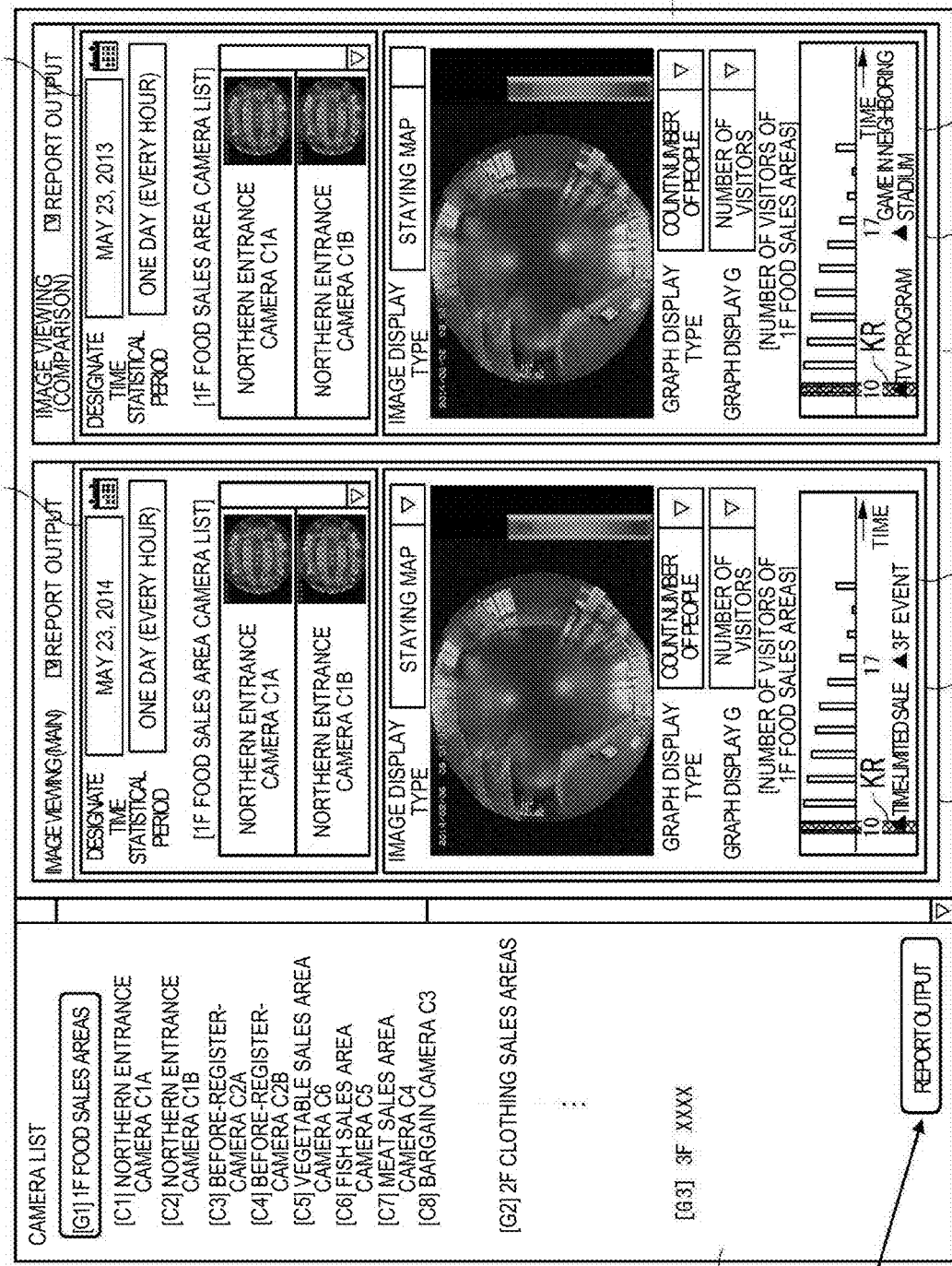
FIG. 10 is a diagram illustrating a first example of an operation screen including a moving information analysis image of a store, generated by a display image generating section of the server of the present exemplary embodiment.
Figure 11:
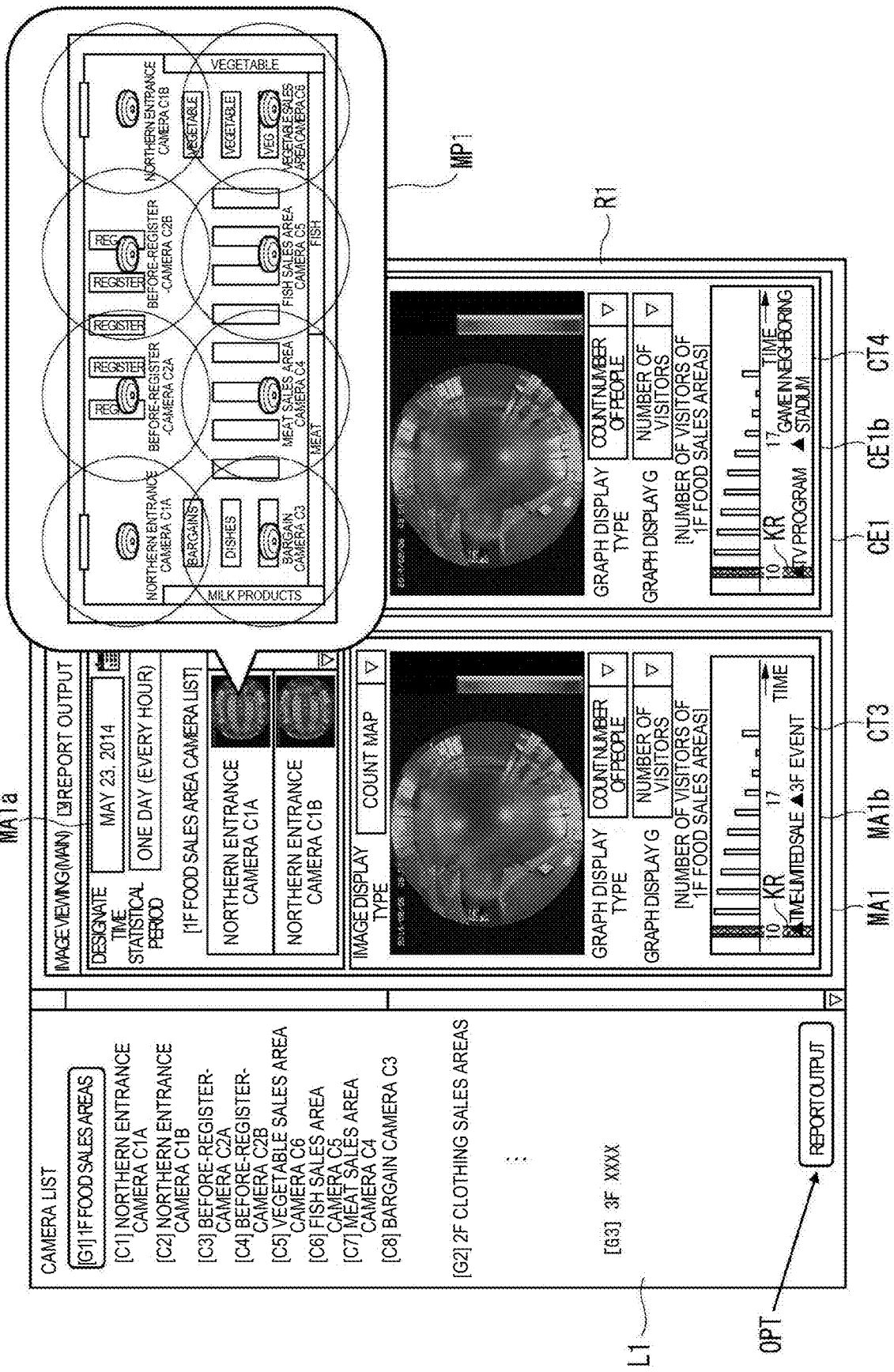
FIG. 11 is a diagram illustrating a second example of an operation screen including a moving information analysis image of the store, generated by the display image generating section of the server of the present exemplary embodiment.

FIG. 10 is a diagram illustrating a first example of an operation screen including a moving information analysis image of store A, generated by display image generating section 350 of server 300 of the present exemplary embodiment. FIG. 11 is a diagram illustrating a second example of an operation screen including a moving information analysis image of store A, generated by display image generating section 350 of server 300 of the present exemplary embodiment. The operation screens illustrated in FIGS. 10 and 11 are displayed on monitor 450 by display image generating section 350.

On the operation screen illustrated in FIG. 10, a list of screens for selecting the cameras provided in the store is hierarchically shown in left display region L1. For example, in the food sales area (identification number: G1) of floor 1 (1F), northern entrance camera C1A (identification number: C1), northern entrance camera C1B (identification number: C2), before-register-camera C2A (identification number: C3), before-register-camera C2B (identification number: C4), vegetable sales area camera C6 (identification number: C5), fish sales area camera C5 (identification number: C6), meat sales area camera C4 (identification number: C7), and bargain camera C3 (identification number: C8) are shown hierarchically. This is also the same for a clothing sales area of floor 2 (2F) and other sales areas, and thus description thereof will be omitted.

On the operation screen illustrated in FIG. 10, display region MA1 of main (for example, present) moving information analysis information and display region CE1 of subsidiary (for example, comparison) moving information analysis information are displayed in right display region R1.

In display region MA1 of moving information analysis information, a designated condition display region MA1a including a designated time (including the date) at which server 300 generates a viewing object moving information analysis image, a statistical period indicating, for example, the unit of half a day, the unit of a day, the unit of one week, or the unit of one month, and a screen for selecting the cameras of each sales area selected in display region L1, and moving information analysis result display region MA1b including an image display type of a moving information analysis image, a graph display type, a graph display G (group), and display region CT1 of the number of visitors of each sales area, are displayed.

The image display type of a moving information analysis image includes a staying map, illustrated in FIG. 10, in which staying information of a moving object (for example, a person) is shown, a count map, illustrated in FIG. 11, in which passing information of a moving object (for example, a person) is shown, and captured images thereof. The number of moving objects (for example, persons) detected by people counting section CT in time series (for example, every hour in FIGS. 10 and 11) is shown in display region CT1 of the number of visitors of each sales area. For example, if input device 400 shifts selection bar KR displayed in display region CT1 of the number of visitors of each sales area in the time direction through a user's input operation, display image generating section 350 sequentially displays moving information analysis images which are generated at time points indicated by selection bar KR.

As illustrated in FIG. 11, instead of the screen for selecting the cameras of each sales area in display region MA1 of moving information analysis information, an example of layout MP1 in which the plurality of cameras illustrated in FIG. 9 are provided in each sales area may be displayed.

Similarly, on display region CE1 of subsidiary moving information analysis information, a designated condition display region CE1a including a designated time (including the date) at which server 300 generates a viewing object moving information analysis image as display region MA1 of main moving information analysis information, a statistical period indicating, for example, the unit of half a day, the unit of a day, the unit of one week, or the unit of one month, and a screen for selecting the cameras of each sales area selected in display region MA1 of main moving information analysis information, and moving information analysis result display region CE1b including an image display type of a moving information analysis image, a graph display type, a graph display G (group), and display region CT2 of the number of visitors of each sales area, are displayed. In a case of using display region CE1 of subsidiary moving information analysis information, for example, not only comparison between states before and after a layout in the store is changed but also usage such as comparison between states before and after a discount seal is attached to merchandise, comparison between states before and after a time-limited sale is performed, comparison between a date and the same date in the previous year, and comparison between stores (for example, and comparison between a meat sales area of store A and a meat sales area of the store B) may be included.

The number of moving objects (for example, persons) detected by people counting section CT in a time series (for example, every hour in FIGS. 10 and 11) is shown in display region CT2 of the number of visitors of each sales area. For example, if input device 400 shifts selection bar KR displayed in display region CT2 of the number of visitors of each sales area in the time direction through a user's input operation, display image generating section 350 sequentially reproduces and displays moving information analysis images which are generated at time points indicated by selection bar KR.

Input device 400 can designate a specific time zone on the time axis and can input a comment (for example, a time-limited sale, a 3F event, a TV program, and a game in a neighboring stadium), through a user's input operation, to display region CT1 of the number of visitors of each sales area of display region MA1 of main (for example, present) moving information analysis information and display region CT2 of the number of visitors of each sales area of display region CE1 of subsidiary (for example, comparison) moving information analysis information.

In FIG. 11, the remaining content is the same as that described with reference to FIG. 10 except that the image display type is a count map, and thus detailed description thereof will be omitted. In the same manner as in FIG. 10, also in FIG. 11, for example, if input device 400 shifts selection bar KR displayed in each of display regions CT3 and CT4 of the number of visitors of each sales area in the time direction through a user's input operation, display image generating section 350 sequentially reproduces and displays moving information analysis images which are generated at time points indicated by selection bar KR.

Figure 12:
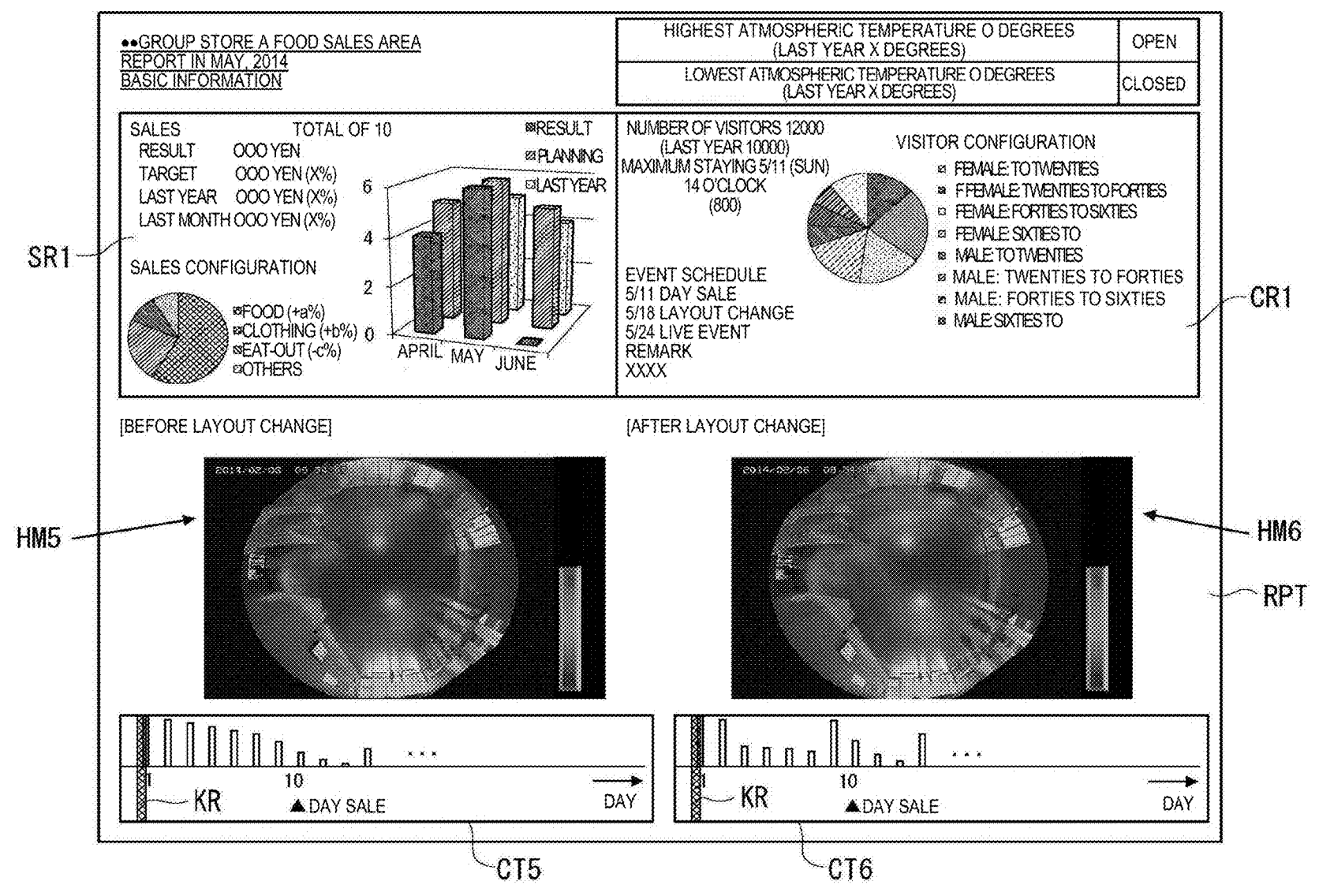

FIG. 12 is a diagram illustrating an example of operation screen RPT of a monthly report related to a food sales area of store A, dated in May, 2014, generated by report generating output section 360 of server 300 of the present exemplary embodiment. The monthly report (refer to FIG. 12) as an example of a moving information analysis report of the present exemplary embodiment is a screen which is generated by report generating output section 360 and is displayed on monitor 450 when report output button OPT provided on the lower part of left display region L1 of the operation screen illustrated in FIG. 10 or FIG. 11 is pressed via input device 400. Report generating output section 360 of server 300 may output the monthly report illustrated in FIG. 12 or partial information thereof (for example, a monthly report of a meat sales area among the food sales areas) from a printer (not illustrated) provided in store A. Consequently, a salesperson in store A can receive the printed and distributed monthly report of, for example, all the food sales areas or the meat sales area as a part thereof, in the form of a moving information analysis image in which a visitor is not shown being output.

The operation screen RPT of the monthly report (the moving information analysis report) illustrated in FIG. 12 shows various information pieces including a title of the monthly report, information regarding an atmospheric temperature, display region SR1 related to sales information, display region CR1 related to statistical information such as the number of visitors of a store (for example, store A), display regions of moving information analysis images HM5 and HM6 generated by display image generating section 350 before and after a layout of the sales area is changed as an example of a predetermined event, and display regions CT5 and CT6 of the number of visitors of each sales area. The various information pieces regarding the title of the monthly report, the information regarding the atmospheric temperature, the sales information, the event information, the information regarding a configuration of the visitors, and the like are transmitted, for example, from server 600 of the operation center to a server (for example, server 300) of a corresponding store (for example, store A). The various information pieces regarding the title of the monthly report, the information regarding the atmospheric temperature, the sales information, the event information, the information regarding a configuration of the visitors, and the like may be stored in server 300 or a storing section (not illustrated) of the store in advance.

Also in the operation screen RPT of the monthly report illustrated in FIG. 12, in the same manner as in FIG. 10 or FIG. 11, for example, if input device 400 shifts selection bar KR displayed in each of display regions CT5 and CT6 of the number of visitors of each sales area in the time direction through a user's input operation, display image generating section 350 sequentially displays moving information analysis images which are generated at time points indicated by selection bar KR.

As mentioned above, in moving information analyzing system 500A of the present exemplary embodiment, camera 100 generates a background image of a captured image of a predetermined imaging region, extracts moving information regarding a staying position or a passing position in the imaging region of a moving object (for example, a person) included in the captured image, and transmits the background image of the captured image and the moving information of the moving object to server 300 at a predetermined transmission cycle. Server 300 generates a moving information analysis image in which the moving information of the moving object is superimposed on the background image of the captured image, and displays the moving information analysis image on monitor 450.

Consequently, moving information analyzing system 500A generates the background image which is a base of the moving information analysis image so that the moving object (for example, a person) is removed so as not to be shown therein, and can thus appropriately protect the privacy of the moving object (the person) shown in an imaging region when a moving information analysis image is generated. Since moving information analyzing system 500A superimposes the moving information regarding the staying position or the passing position in the imaging region of the moving object (the person) on the background image which has already been updated at a predetermined timing (for example, the time at which a periodic transmission cycle arrives), it is possible to visually display a moving information analysis image which appropriately indicates accurate moving information regarding the staying position or the passing position in the imaging region of the moving object to a user in a predefined transmission cycle in a state in which the moving object is removed from the captured image.

Since moving information analyzing system 500A gives, to schedule control section 50 of the camera, an instruction for a predetermined transmission cycle for transmitting a background image and moving information of a moving object, it is possible to periodically transmit the background image and the moving information of the moving object to server 300 according to the transmission cycle for which the instruction is given in advance.

Since moving information analyzing system 500A transmits a background image and moving information of a moving object to server 300 when receiving a notification of detection of a predetermined event (for example, an event such as a change of a layout of a sales area in a store) from event information receiving section 70, server 300 can generate a moving information analysis image in which moving information regarding staying positions or passing positions of a moving object in an imaging region before and after the time at which the predetermined event is detected is accurately reflected.

Since moving information analyzing system 500A transmits a background image and moving information of a moving object to server 300 when scene identifying section SD detects a change (for example, a change of a layout of a sales area in a store) in a captured image, server 300 can generate a moving information analysis image in which moving information regarding staying positions or passing positions of a moving object in an imaging region before and after the time at which the change in the captured image is detected is accurately reflected.

In moving information analyzing system 500A, since people counting section CT counts the number of detected moving objects included in a captured image and outputs information regarding the number of detected moving objects to transmitter 60, it is possible to display a moving information analysis image including information regarding staying positions or passing positions of a moving object in an imaging region and a display screen (operation screen) including the number of detected moving objects on monitor 450.

Since moving information analyzing system 500A does not transmit a background image and moving information of a moving object in a transmission cycle including the time at which event information receiving section 70 receives a notification of detection of a predetermined event, it is possible to prevent moving information pieces regarding staying positions or passing positions of a moving object in an imaging region before and after the predetermined event (for example, a change of a layout of a sales area in a store) is detected from being used together when server 300 generates a moving information analysis image.

In moving information analyzing system 500A, since report generating output section 360 generates a moving information analysis report including a moving information analysis image generated before detecting a predetermined event (for example, a change of a layout of a sales area in a store) and a moving information analysis image generated after detecting the same event, it is possible to show how moving information regarding a staying position or a passing position of a moving object in an imaging region changes due to the predetermined event in contrasted and easily understandable manner.

In moving information analyzing system 500A, a generated moving information analysis report is displayed on monitor 450 through a predetermined input operation (for example, a user's operation of pressing the report output button), and thus the moving information analysis report can be visually displayed to the user.

In moving information analyzing system 500A, since respective cameras 100, 100A, . . . , and 100N perform generation of a background image of a captured image and extraction of moving information regarding a staying position or a passing position of a moving object included in the captured image, and then server 300 generates and displays a moving information analysis image, a processing load on server 300 can be reduced when compared with a case where server 300 performs generation of a background image of a captured image and extraction of moving information regarding a staying position or a passing position of a moving object included in the captured image, and thus it is possible to alleviate a limitation on the number of cameras which can be connected to single server 300.

First Modification Example of Present Exemplary Embodiment

Figure 13:
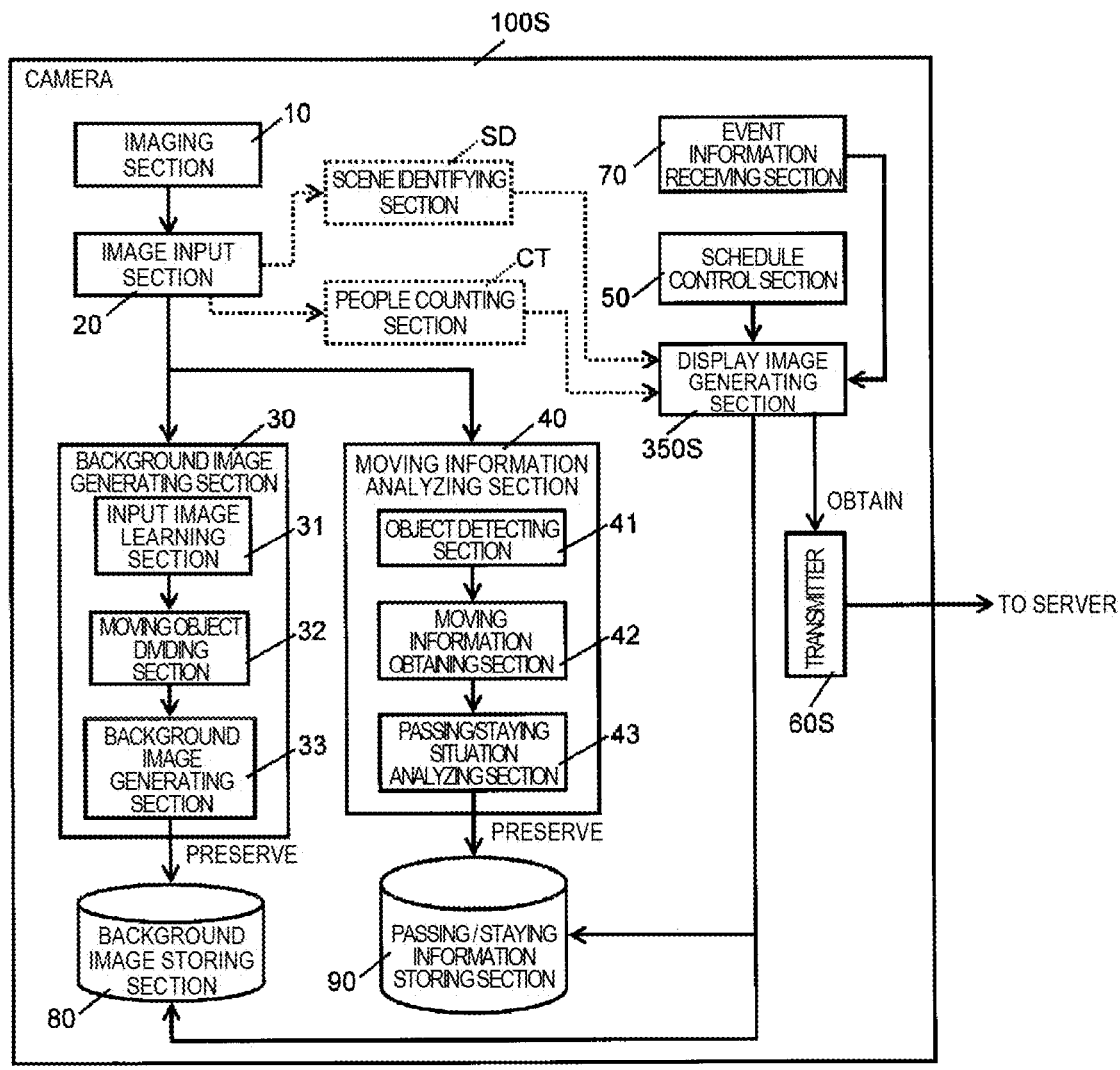
FIG. 13 is a block diagram illustrating details of a functional internal configuration of a camera of a first modification example of the present exemplary embodiment.

In the above-described present exemplary embodiment, the process of generating a moving information analysis image is performed by server 300, but the process of generating a moving information analysis image may also be performed by camera 100 (refer to FIG. 13). FIG. 13 is a block diagram illustrating details of a functional internal configuration of camera 100S of a first modification example of the present exemplary embodiment. Camera 100S illustrated in FIG. 13 includes imaging section 10, image input section 20, background image generating section 30, moving information analyzing section 40, schedule control section 50, transmitter 60S, event information receiving section 70, background image storing section 80, passing/staying information storing section 90, and display image generating section 350S. In description of each section of camera 100S illustrated in FIG. 13, constituent elements having the same configuration and operation as those of camera 100 illustrated in FIG. 2 are given the same reference numerals, and description thereof will be omitted, and differing content will be described.

Display image generating section 350S as an example of an image generating section generates a moving information analysis image in which moving information regarding a staying position and a passing position of a moving object is superimposed on a background image by using background image data preserved in background image storing section 80 and extraction result data of the moving information regarding the staying information or the passing information of the moving object preserved in passing/staying information storing section 90 in response to an instruction from schedule control section 50 or event information receiving section 70, and outputs the moving information analysis image to transmitter 60.

Transmitter 60S transmits data on the moving information analysis image generated by display image generating section 350S to server 300.

As described above, in the first modification example of the present exemplary embodiment, camera 100S generates a background image of a captured image of a predetermined imaging region, extracts moving information regarding a staying position or a passing position in the imaging region of a moving object (for example, a person) included in the captured image, and generates a moving information analysis image in which the moving information of the moving object is superimposed on the background image of the captured image by using the background image of the captured image and the moving information of the moving object.

Consequently, camera 100S generates the background image which is a base of the moving information analysis image so that the moving object (for example, a person) is removed so as not to be shown therein, and can thus appropriately protect privacy of the moving object (the person) shown in an imaging region when a moving information analysis image is generated. Since camera 100S superimposes the moving information regarding the staying position or the passing position in the imaging region of the moving object (the person) on a captured image which is obtained in real time, it is possible to generate a moving information analysis image which appropriately indicates the latest moving information regarding the staying position or the passing position in the imaging region of the moving object in a state in which the moving object is removed from the captured image.

Since camera 100S performs a process up to a point of generating a moving information analysis image and transmits moving information analysis image data which is a result of the process to server 300, for example, server 300 may not perform the process of generating a moving information analysis image in a state in which a processing load on server 300 is considerably high, and thus it is possible to minimize an increase in the processing load on server 300.

Here, a description will be made of each of configurations, operations, and effects of the moving information analyzing system, the camera, and the moving information analyzing method according to the present disclosure.

According to an exemplary embodiment of the present disclosure, there is provided a moving information analyzing system including a camera; and a server that is connected to the camera, in which the camera includes an imaging section that captures an image of a predetermined imaging region; a background image generating section that generates a background image of the captured image of the imaging region; a moving information analyzing section that extracts moving information regarding a staying position or a passing position of a moving object included in the captured image in the imaging region; and a transmitter that transmits the background image generated by the background image generating section and the moving information of the moving object extracted by the moving information analyzing section to the server in a predetermined transmission cycle, and in which the server includes an image generating section that generates a moving information analysis image in which the moving information of the moving object is superimposed on the background image of the captured image; and a display control section that displays the moving information analysis image generated by the image generating section on a display section.

In this configuration, the camera generates a background image of a captured image of a predetermined imaging region, extracts moving information regarding a staying position or a passing position of a moving object (for example, a person) included in the captured image in the imaging region, and transmits the background image the captured image and the moving information of the moving object to the server in a predetermined transmission cycle. The server generates a moving information analysis image in which the moving information of the moving object is superimposed on the background image of the captured image, and displays the moving information analysis image on a display section.

Consequently, the moving information analyzing system generates the background image which is a base of the moving information analysis image so that the moving object (for example, a person) is removed so as not to be shown therein, and can thus appropriately protect the privacy of the moving object (the person) shown in an imaging region when a moving information analysis image is generated. Since the moving information analyzing system superimposes the moving information regarding the staying position or the passing position in the imaging region of the moving object (the person) on the background image which has already been updated at a predetermined timing (for example, the time at which a periodic transmission cycle arrives), it is possible to visually display a moving information analysis image which appropriately indicates accurate moving information regarding the staying position or the passing position in the imaging region of the moving object to a user in a predefined transmission cycle in a state in which the moving object is removed from the captured image.

According to the exemplary embodiment of the present disclosure, in the moving information analyzing system, the camera further includes a schedule control section that gives an instruction for the predetermined transmission cycle for transmitting the background image and the moving information of the moving object to the transmitter.

According to this configuration, since the moving information analyzing system gives, to the schedule control section of the camera, an instruction for a predetermined transmission cycle for transmitting a background image and moving information of a moving object, it is possible to periodically transmit the background image and the moving information of the moving object to the server according to the transmission cycle for which the instruction is given in advance.

According to the exemplary embodiment of the present disclosure, in the moving information analyzing system, the camera further includes an event information obtaining section that obtains a notification of detection of a predetermined event, and the event information obtaining section gives an instruction for a transmission timing of the background image and the moving information of the moving object to the transmitter after a notification of detection of the predetermined event is obtained.

According to this configuration, since the moving information analyzing system transmits a background image and moving information of a moving object to the server when the event information obtaining section obtains a notification of detection of a predetermined event (for example, an event such as a change of a layout of a sales area in a store), the server can generate a moving information analysis image in which moving information regarding staying positions or passing positions of a moving object in an imaging region before and after the time at which the predetermined event is detected is accurately reflected.

According to the exemplary embodiment of the present disclosure, in the moving information analyzing system, the camera further includes an image change detecting section that detects a change in the captured image, and the image change detecting section gives an instruction for a transmission timing of the background image and the moving information of the moving object to the transmitter after a change in the captured image is detected.

According to this configuration, since the moving information analyzing system transmits a background image and moving information of a moving object to the server when the image change detecting section detects a change (for example, a change of a layout of a sales area in a store) in a captured image, the server can generate a moving information analysis image in which moving information regarding staying positions or passing positions of a moving object in an imaging region before and after the time at which the change in the captured image is detected is accurately reflected.

According to the exemplary embodiment of the present disclosure, in the moving information analyzing system, the camera further includes a moving object counting section that counts the number of detected moving objects included in the captured image, and the moving object counting section outputs information regarding the number of detected moving objects included in the captured image to the transmitter.

According to this configuration, in the moving information analyzing system, since the moving object counting section counts the number of detected moving objects included in a captured image and outputs information regarding the number of detected moving objects to the transmitter, it is possible to display a moving information analysis image including information regarding staying positions or passing positions of a moving object in an imaging region and a display screen (operation screen) including the number of detected moving objects on the display section.

According to the exemplary embodiment of the present disclosure, in the moving information analyzing system, the transmitter omits transmission of the background image and the moving information of the moving object in the predetermined transmission cycle including the time at which the event information obtaining section obtains a notification of detection of the predetermined event.

Since the moving information analyzing system does not transmit a background image and moving information of a moving object in a transmission cycle including the time at which the event information obtaining section obtains a notification of detection of a predetermined event, it is possible to prevent moving information pieces regarding staying positions or passing positions of a moving object in an imaging region before and after the predetermined event (for example, a change of a layout of a sales area in a store) is detected from being used together when the server generates a moving information analysis image.

According to the exemplary embodiment of the present disclosure, in the moving information analyzing system, the server further includes a report generating section that generates a moving information report including the moving information analysis image generated by the image generating section before the predetermined event is detected and the moving information analysis image generated by the image generating section after the predetermined event is detected.

According to this configuration, in the moving information analyzing system, since the report generating section generates a moving information analysis report including a moving information analysis image generated before detecting a predetermined event (for example, a change of a layout of a sales area in a store) and a moving information analysis image generated after detecting the same event, it is possible to show how moving information regarding a staying position or a passing position of a moving object in an imaging region changes due to the predetermined event in contrasted and easily understandable manner.

According to the exemplary embodiment of the present disclosure, in the moving information analyzing system, the report generating section displays the moving information analyzing report on the display section in response to a predetermined input operation.

According to this configuration, in the moving information analyzing system, a generated moving information analysis report is displayed on the display section through a predetermined input operation (for example, a user's operation of pressing a report output button), and thus the moving information analysis report can be visually displayed to the user.

According to an exemplary embodiment of the present disclosure, there is provided a camera including an imaging section that captures an image of a predetermined imaging region; a background image generating section that generates a background image of the captured image of the imaging region; a moving information analyzing section that extracts moving information regarding a staying position or a passing position of a moving object included in the captured image in the imaging region; and an image generating section that generates a moving information analysis image in which the moving information of the moving object is superimposed on the background image of the captured image by using the background image generated by the background image generating section and the moving information of the moving object extracted by the moving information analyzing section.

According to this configuration, the camera generates a background image of a captured image of a predetermined imaging region, extracts moving information regarding a staying position or a passing position in the imaging region of a moving object (for example, a person) included in the captured image, and generates a moving information analysis image in which the moving information of the moving object is superimposed on the background image of the captured image by using the background image of the captured image and the moving information of the moving object.

Consequently, the camera generates the background image which is a base of the moving information analysis image so that the moving object (for example, a person) is removed so as not to be shown therein, and can thus appropriately protect privacy of the moving object (the person) shown in an imaging region when a moving information analysis image is generated. Since the camera superimposes the moving information regarding the staying position or the passing position in the imaging region of the moving object (the person) on a background image which is already updated at the time of a predetermined timing (for example, the time at which a periodic transmission cycle arrives), it is possible to generate a moving information analysis image which appropriately indicates accurate moving information regarding the staying position or the passing position in the imaging region of the moving object in a state in which the moving object is removed from the captured image.

According to an exemplary embodiment of the present disclosure, there is provided a moving information analyzing method for a moving information analyzing system in which a camera and a server that is connected to each other, the method including causing the camera to captures an image of a predetermined imaging region, to generate a background image of the captured image of the imaging region, to extract moving information regarding a staying position or a passing position of a moving object included in the captured image in the imaging region, and to transmit the generated background image and the moving information of the extracted moving object to the server in a predetermined transmission cycle; and causing the server to generate a moving information analysis image in which the moving information of the moving object is superimposed on the background image of the captured image, and to display the generated moving information analysis image on a display section.

In this method, the camera generates a background image of a captured image of a predetermined imaging region, extracts moving information regarding a staying position or a passing position of a moving object (for example, a person) included in the captured image in the imaging region, and transmits the background image of the captured image and the moving information of the moving object to the server in a predetermined transmission cycle. The server generates a moving information analysis image in which the moving information of the moving object is superimposed on the background image of the captured image, and displays the moving information analysis image on a display section.

Consequently, the moving information analyzing system generates the background image which is a base of the moving information analysis image so that the moving object (for example, a person) is removed so as not to be shown therein, and can thus appropriately protect the privacy of the moving object (the person) shown in an imaging region when a moving information analysis image is generated. Since the moving information analyzing system superimposes the moving information regarding the staying position or the passing position in the imaging region of the moving object (the person) on the background image which has already been updated at a predetermined timing (for example, the time at which a periodic transmission cycle arrives), it is possible to visually display a moving information analysis image which appropriately indicates accurate moving information regarding the staying position or the passing position in the imaging region of the moving object to a user in a predefined transmission cycle in a state in which the moving object is removed from the captured image.

As mentioned above, although the exemplary embodiment of the moving information analyzing system and the moving information analyzing method according to the present disclosure have been described with reference to the drawings, needless to say, the present disclosure is not limited to the exemplary embodiment. It is obvious that a person skilled in the art can conceive of various modifications, alterations, replacements, additions, deletions, and equivalents within the scope of the invention disclosed in the claims, and it is understood that they naturally fall within the technical scope of the present disclosure.

Second Modification Example of Present Exemplary Embodiment

Figure 14:
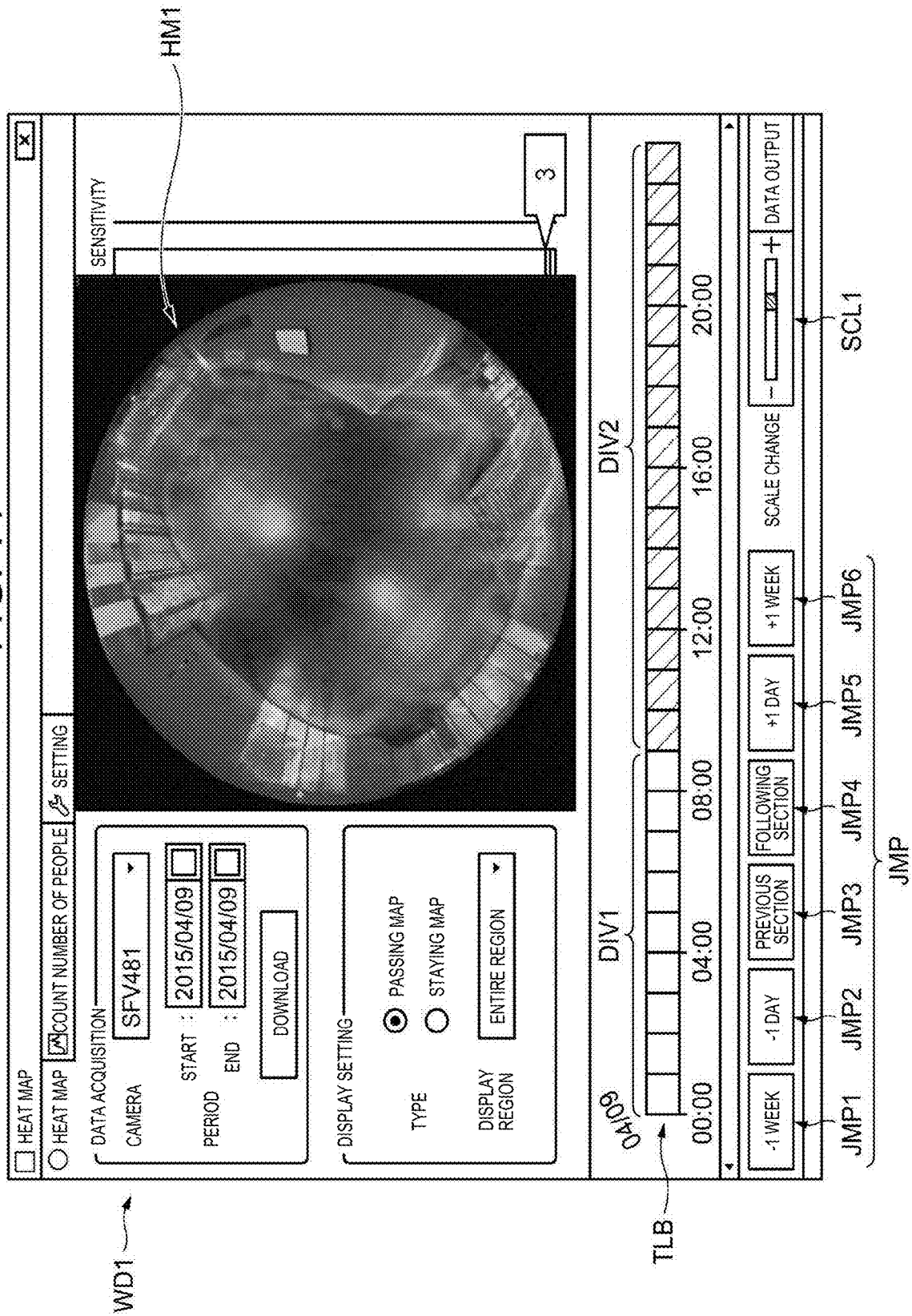
FIG. 14 is a diagram illustrating a third example of an operation screen including a moving information analysis image of the store, generated by the display image generating section of the server according to a second modification example of the present exemplary embodiment.

Server 300 according to a second modification example of the present exemplary embodiment may display, for example, operation screen WD1 illustrated in FIG. 14 in addition to the operation screen illustrated in FIG. 10 or 11 when an operation screen including a generated moving information analysis image is displayed on monitor 450. FIG. 14 is a diagram illustrating a third example of an operation screen including a moving information analysis image of store A, generated by display image generating section 350 of server 300 according to the second modification example of the present exemplary embodiment.

Operation screen WD1 illustrated in FIG. 14 displays an input column (data acquisition column) for conditions for designating data (that is, background image data preserved in background image storing section 80 and extraction result data of moving information regarding staying information or passing information of a moving object preserved in passing/staying information storing section 90, and hereinafter, referred to as "camera transmission data") required to generate a moving information analysis image; an input column (display setting column) for a setting item regarding display of the moving information analysis image; moving information analysis image HM1; time line bar TLB; jump buttons JMP formed of a plurality of buttons; and scale changing button SCL1.

In the data acquisition column, an identification number of a camera which is a transmission source of the camera transmission data, and a start day and an end day of a period (that is, a period in which the background image data and the extraction result data of the moving information regarding the staying information or the passing information of the moving object are generated) which is a request object of the camera transmission data are designated. If a download button is pressed, server 300 receives and acquires camera transmission data matching conditions designated in the data acquisition column from a corresponding camera (for example, camera 100), or acquires data which is received and accumulated in server 300 in advance.

In the display setting column, either a passing map (that is, an image such as a heat map visually displaying the number of persons having passed a specific location in an imaging region) or a staying map (that is, an image such as a heat map visually displaying a period of time in which a person has stayed at a specific location) is selected as a display type of moving information analysis image. A region to be displayed may be selected from a moving information analysis image of an imaging region generated by display image generating section 350 as necessary.

In the time line bar TLB, the presence or absence of camera transmission data from the camera is displayed for each time zone (hereinafter, referred to as a "scale"), for example, in a case where a scale corresponding to a day of "Apr. 9, 2015" is designated in the data acquisition column. In other words, the presence or absence of camera transmission data from the camera, corresponding to 24 hours of "Apr. 9, 2015" can be visually identified depending on the presence or absence of a total of 24 colors or patterns of respective cells of the time line bar TLB. More specifically, it is displayed that there is no camera transmission data from the camera in time range DIV1 (that is, a time range from the midnight on Apr. 9, 2015 to 9 a.m.), and it is displayed that there is camera transmission data from the camera in time range DIV2 (that is, a time range from 9 a.m. on Apr. 9, 2015 to the midnight on Apr. 10, 2015). In FIG. 14, a time zone (that is, a single cell) corresponding to a scale indicates an hour.

A time zone (that is, a single cell) corresponding to a scale can be easily changed through a horizontal sliding operation on scale changing button SCL1. For example, in a case where a time zone (that is, a single cell) corresponding to a scale indicates an hour, if a user operates input device 400 such as a mouse so as to slide scale changing button SCL1 toward the right, display image generating section 350 changes a time zone (that is, a single cell) corresponding to a scale to a day longer than an hour, and displays the time line bar TLB again. A time zone longer than an hour is not limited to a day, and may be, for example, two hours, and may be arbitrarily changed. This change can be set, for example, through the user's operation on a screen on which a setting tap of operation screen WD1 illustrated in FIG. 14 is selected.

Similarly, for example, in a case where a time zone (that is, a single cell) corresponding to a scale indicates an hour, if the user operates input device 400 such as a mouse so as to slide scale changing button SCL1 toward the left, display image generating section 350 changes a time zone (that is, a single cell) corresponding to a scale to 15 minutes shorter than an hour, and displays the time line bar TLB again. A time zone shorter than an hour is not limited to 15 minutes, and may be, for example, 30 minutes, and may be arbitrarily changed. This change can be set, for example, through the user's operation on a screen on which the setting tap of operation screen WD1 illustrated in FIG. 14 is selected.

Jump buttons JMP are provided with −1 week button JMP1, −1 day button JMP2, previous section button JMP3, following section button JMP4, +1 day button JMP5, and +1 week button JMP6. However, jump buttons JMP are not limited to such six types of buttons. For example, number portions in "−1 week button JMP1, −1 day button JMP2, +1 day button JMP5, and +1 week button JMP6" including numbers in the names of the buttons may be arbitrarily changed through the user's operation on a setting screen (not illustrated) (for example, a screen on which the setting tap of operation screen WD1 illustrated in FIG. 14 is selected).

For example, in a case where camera transmission data is acquired from the camera to a time point dating back a week from the present time point, if −1 week button JMP1 is pressed through the user's operation, display image generating section 350 replaces moving information analysis image HM1 displayed at the time of pressing the button with a moving information analysis image generated a week before moving information analysis image HM1, and displays the image on monitor 450.

Figure 17:
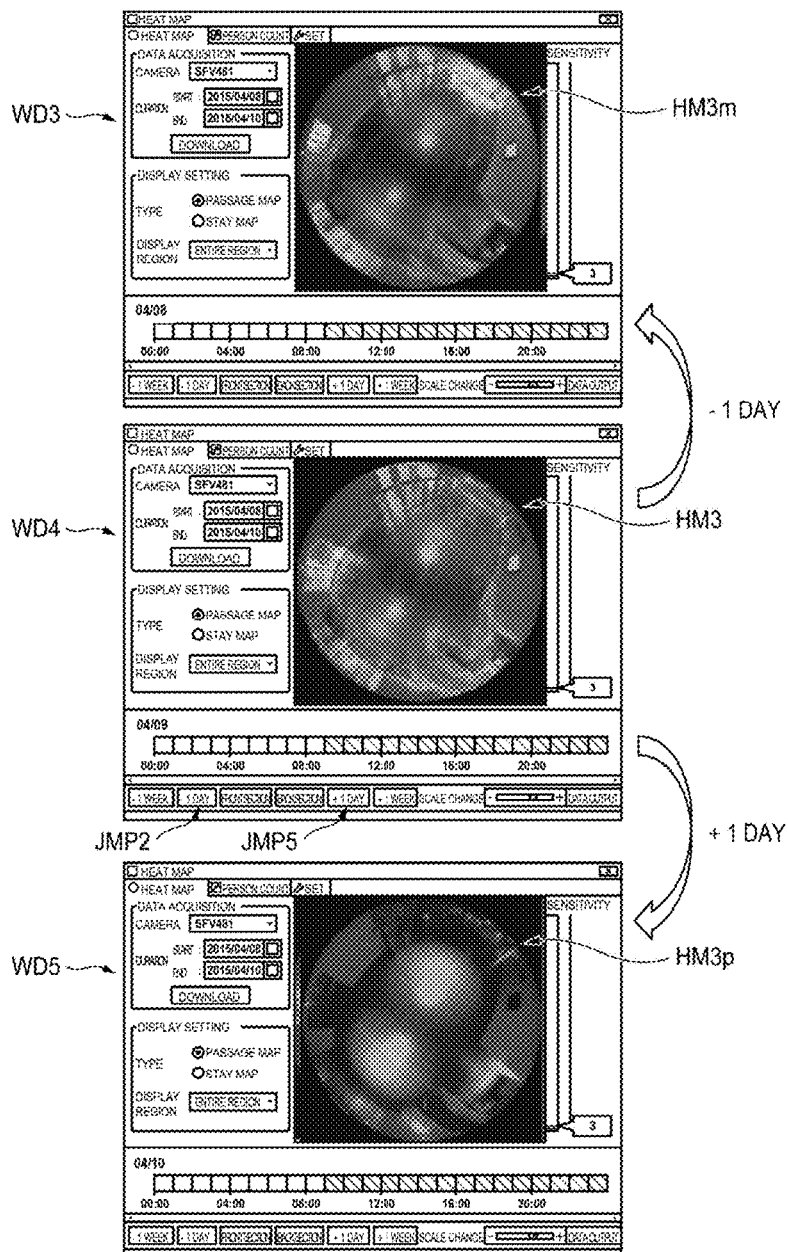
FIG. 17 is a diagram illustrating a switching display example of a moving information analysis image corresponding to pressing of a +1 day button and a −1 day button among jump buttons illustrated in FIG. 14.

For example, in a case where camera transmission data is acquired from the camera to a time point dating back a day from the present time point, if −1 day button JMP2 is pressed through the user's operation, display image generating section 350 replaces moving information analysis image HM1 displayed at the time of pressing the button with a moving information analysis image generated a day before moving information analysis image HM1, and displays the image on monitor 450 (refer to FIG. 17).

For example, in a case where camera transmission data is acquired from the camera to a time point after a day elapses from the present time point, if +1 day button JMP5 is pressed through the user's operation, display image generating section 350 replaces moving information analysis image HM1 displayed at the time of pressing the button with a moving information analysis image generated a day later than moving information analysis image HM1, and displays the image on monitor 450 (refer to FIG. 17).

For example, in a case where camera transmission data is acquired from the camera to a time point after a week elapses from the present time point, if +1 week button JMP6 is pressed through the user's operation, display image generating section 350 replaces moving information analysis image HM1 displayed at the time of pressing the button with a moving information analysis image generated a week later than moving information analysis image HM1, and displays the image on monitor 450.

The time (in other words, a time point or a time zone serving as a starting point of jump) of generating camera transmission data which is a base of a moving information analysis image in a case where one of jump buttons JMP is pressed may be set through the user's operation on, for example, a screen on which the setting tap of operation screen WD1 illustrated in FIG. 14 is selected.

Figure 15:
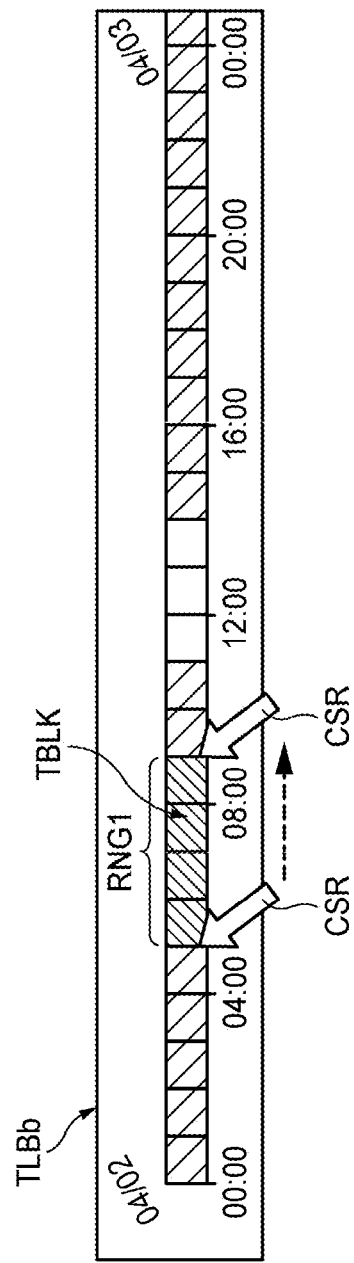
FIG. 15 is a diagram for explaining a time line bar.

Prior to description of previous section button JMP3 and following section button JMP4, a single section will be described with reference to FIG. 15. FIG. 15 is a diagram for explaining the time line bar. For convenience of description, FIG. 15 illustrates time line bar TLBb which is different from time line bar TLB included in operation screen WD1 illustrated in FIG. 14.

In FIG. 15, a time zone (that is, a single cell) corresponding to a scale indicates an hour in the same manner as in FIG. 14. The user can visually identify the presence or absence of camera transmission data from the camera according to a color or a pattern displayed in time line bar TLBb. The user can easily designate in which time zone a moving information analysis image is displayed on monitor 450 in time line bar TLBb by operating server 300 or input device 400.

For example, the user operates input device 400 such as a mouse, performs designation (for example, clicking a left button) by using cursor CSR onto a cell of a start time point of designation object time zone RNG1, drags cursor CSR to an end time point of time zone RNG1, and releases a button of input device 400 such as a mouse at the drag end portion (that is, finishes the drag). If the user's finger pressing the button of input device 400 such as a mouse is released at the drag end position, display image generating section 350 specifies the start time point and the end time point of time zone RNG1. Consequently, display image generating section 350 changes a color or a pattern of time zone RNG1 designated through the user's operation to a color or a pattern which is different from a color or a pattern indicating that there is camera transmission data from the camera, and displays the color or the pattern (refer to FIG. 15).

For example, in time line bar TLBb illustrated in FIG. 15, time zone RNG1 is a time zone from 5 a.m. on April 2 to 9 a.m., and a color or a pattern corresponding to time zone RNG1 is different from colors or patterns of time zones from the midnight to 11 a.m. on April 2, and after 2 a.m. in which there is camera transmission data from the camera. A case is assumed in which time line bar TLBb illustrated in FIG. 15 is displayed to be included in operation screen WD1 illustrated in FIG. 14, a moving information analysis image on the operation screen is generated by using, for example, camera transmission data corresponding to three days, and a time zone (that is, a single cell) corresponding to a scale indicates, for example, an hour. In this case, time line bar TLBb is formed of cells having a length (24 hours×3 days=72) corresponding to three days in the entire length, but in a case where all the cells are not displayed on the operation screen, display image generating section 350 displays time line bar TLBb to be able to be scrolled in the horizontal direction. Therefore, in a case where the user desires to check whether or not camera transmission data is present at the time and date which is not displayed on time line bar TLBb at a glance, the user can easily check the data by scrolling time line bar TLBb.

Display image generating section 350 treats, for example, time zone RNG1 described with reference to FIG. 15 as a single section, and replaces moving information analysis image HM1 displayed at the time of pressing with a moving information analysis image generated a single section (for example, four hours corresponding to time zone RNG1) before moving information analysis image HM1, and displays the moving information analysis image on monitor 450 if previous section button JMP3 is pressed among jump buttons JMP illustrated in FIG. 14 through the user's operation.

On the other hand, display image generating section 350 treats, for example, time zone RNG1 described with reference to FIG. 15 as a single section, and replaces moving information analysis image HM1 displayed at the time of pressing with a moving information analysis image generated a single section (for example, four hours corresponding to time zone RNG1) later than moving information analysis image HM1, and displays the moving information analysis image on monitor 450 if following section button JMP4 is pressed among jump buttons JMP illustrated in FIG. 14 through the user's operation.

Figure 16:
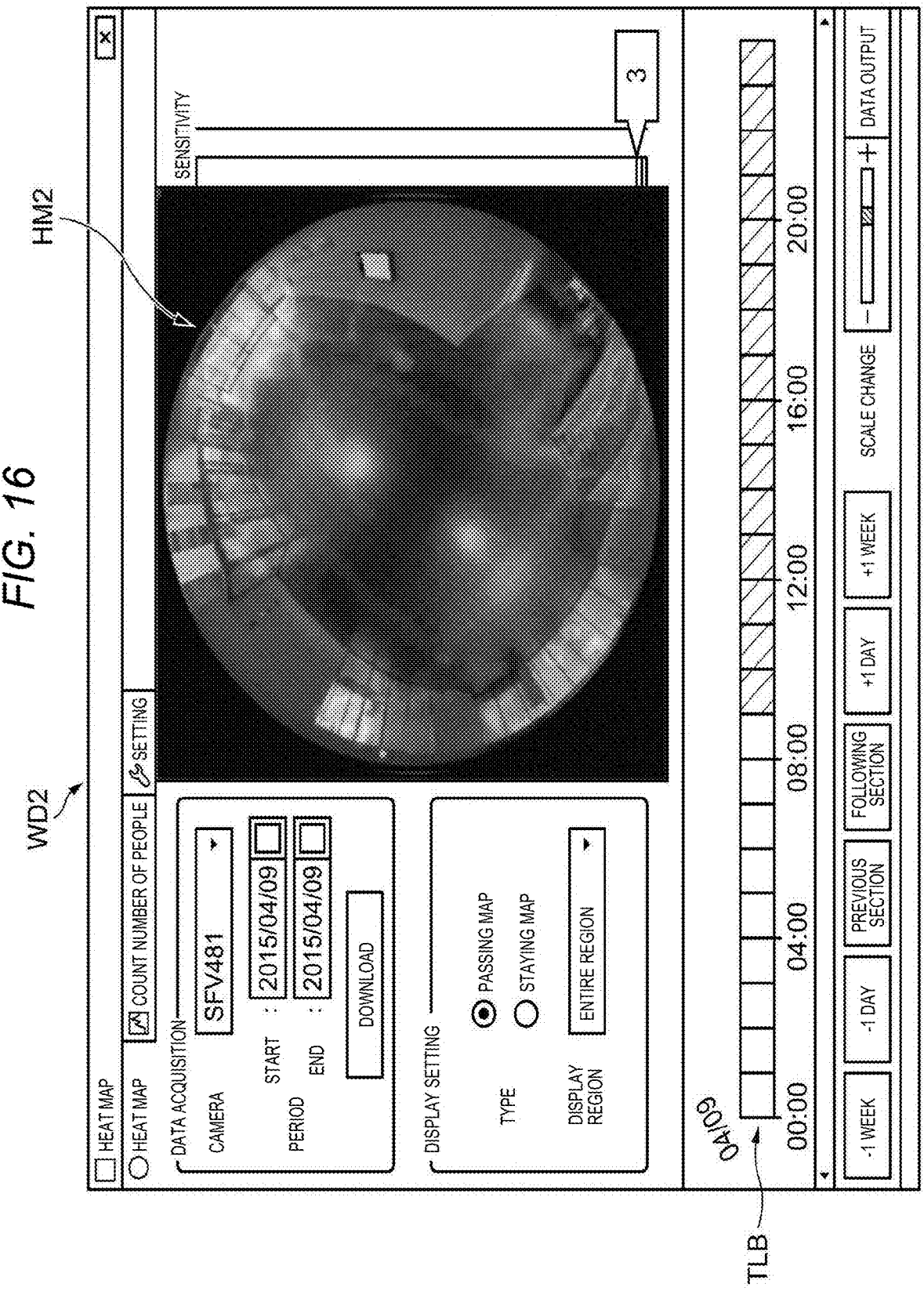
FIG. 16 is a diagram illustrating an example of an operation screen including a moving information analysis image of the store, corresponding to a time range changed through designation on the time line bar included in the operation screen illustrated in FIG. 14.

FIG. 16 is a diagram illustrating an example of operation screen WD2 including a moving information analysis image of store A, corresponding to a time range changed through designation on time line bar TLB included in operation screen WD1 illustrated in FIG. 14. FIG. 16 illustrates a case where a time range designated by the user in time line bar TLB is changed, and thus moving information analysis image HM1 illustrated in FIG. 14 is changed to moving information analysis image HM2 which is generated by display image generating section 350 so as to correspond to the changed time range, and the moving information analysis image HM2 is displayed on monitor 450.

After time zone TBLK (refer to time zone RNG1 illustrated in FIG. 15) corresponding to a single section is specified through the user's designation operation on time line bar TLB, the user may perform an operation (for example, clicking of a right button) on specified time zone TBLK by using input device 400 such as a mouse, and may move time zone TBLK on time line bar TLB in a state in which time zone TBLK is temporarily fixed (in other words, specified time zone TBLK is caught on time line bar TLB). Through this movement operation, display image generating section 350 can generate a moving information analysis image corresponding to a time zone after the movement operation and display the moving information analysis image on monitor 450.

For example, in a case where a time zone before a movement operation is 9 a.m. to 1 p.m., and a time zone after the movement operation is 4 p.m. to 8 p.m. (time zones are the same as each other as four hours), display image generating section 350 may replace operation screen WD2 including a moving information analysis image corresponding to 9 a.m. to 1 p.m. with another operation screen including a moving information analysis image corresponding to 4 p.m. to 8 p.m., and display the operation screen on monitor 450.

FIG. 17 a diagram illustrating a switching display example of a moving information analysis image corresponding to pressing of +1 day button JMP5 and −1 day button JMP2 among jump buttons JMP displayed in FIG. 14. In FIG. 17, a start day in the data acquisition column is Apr. 8, 2015, an end day is Apr. 10, 2015, data transmitted from the camera is acquired by server 300 for three days, and the present time point is assumed to be Apr. 9, 2015.

For example, in a case where data transmitted from the camera is acquired to a time point (Apr. 8, 2015) dating back a day from the present time point (Apr. 9, 2015), if −1 day button JMP2 is pressed, display image generating section 350 replaces moving information analysis image HM3 displayed at the time of pressing with moving information analysis image HM3$m$ which is generated a day before moving information analysis image HM3, and displays an operation screen including moving information analysis image HM3$m$ on monitor 450.

For example, in a case where data transmitted from the camera is acquired to a time point (Apr. 10, 2015) after a day elapses from the present time point (Apr. 9, 2015), if +1 day button JMP5 is pressed, display image generating section 350 replaces moving information analysis image HM3 displayed at the time of pressing with moving information analysis image HM3p which is generated a day later than moving information analysis image HM3, and displays an operation screen including moving information analysis image HM3p on monitor 450 (refer to FIG. 17).

Consequently, server 300 according to the second modification example of the present exemplary embodiment can visually display a moving information analysis image which appropriately indicates accurate moving information regarding staying position or passing position in an imaging region of a moving object to a user in a state in which the moving object is removed from the captured image while appropriately protecting privacy of the moving object (person) reflected in the imaging region when a moving information analysis image is generated, and can perform switching to and displaying of a moving information analysis image generated at a differing timing through the user's simple operation (pressing of any one of jump buttons JMP) so as to improve the user's convenience (for example, it is easy to check a change in a moving information analysis image).

History of Reaching Third Modification Example of Present Exemplary Embodiment

For example, when monitoring moving information of people passing in a wide observation object area such as a large store, there is a limit in a viewing angle in a single camera, a plurality of cameras may be installed (refer to FIG. 9). However, in the related art, for example, in a case where a single camera is assumed to image at least one sales area, pieces of moving information obtained respective cameras imaging individual sales areas in the same time zone in an observation object area in which switching between a plurality of cameras are provided cannot occur instantaneously. Thus, a user cannot easily compare details of moving information obtained by the respective cameras which capture images of the different individual sales areas in the same time zone.

Third Modification Example of the Present Exemplary Embodiment

Therefore, in the following third modification example of the present exemplary embodiment, a description will be made of examples of a moving information analyzing system which displays pieces of moving information obtained by respective cameras capturing images of different individual sales areas in the same time zone are displayed in a switching manner, and can thus contribute to a user's marketing as a result of an observer (user) being able to easily perform comparison, and a moving information analyzing method.

Since an internal configuration of a camera or a server forming moving information analyzing system 500A according to the third modification example of the present exemplary embodiment is the same as the internal configuration of the camera or the server forming moving information analyzing system 500 according to the present exemplary embodiment, the same constituent elements are given the same reference numerals, description thereof will be made briefly or omitted, and different content will be described. Moving information analyzing system 500A according to the third modification example of the present exemplary embodiment includes at least a plurality of cameras 100, and 100A to 100N, and server 300 (refer to FIG. 1).

Figure 18:
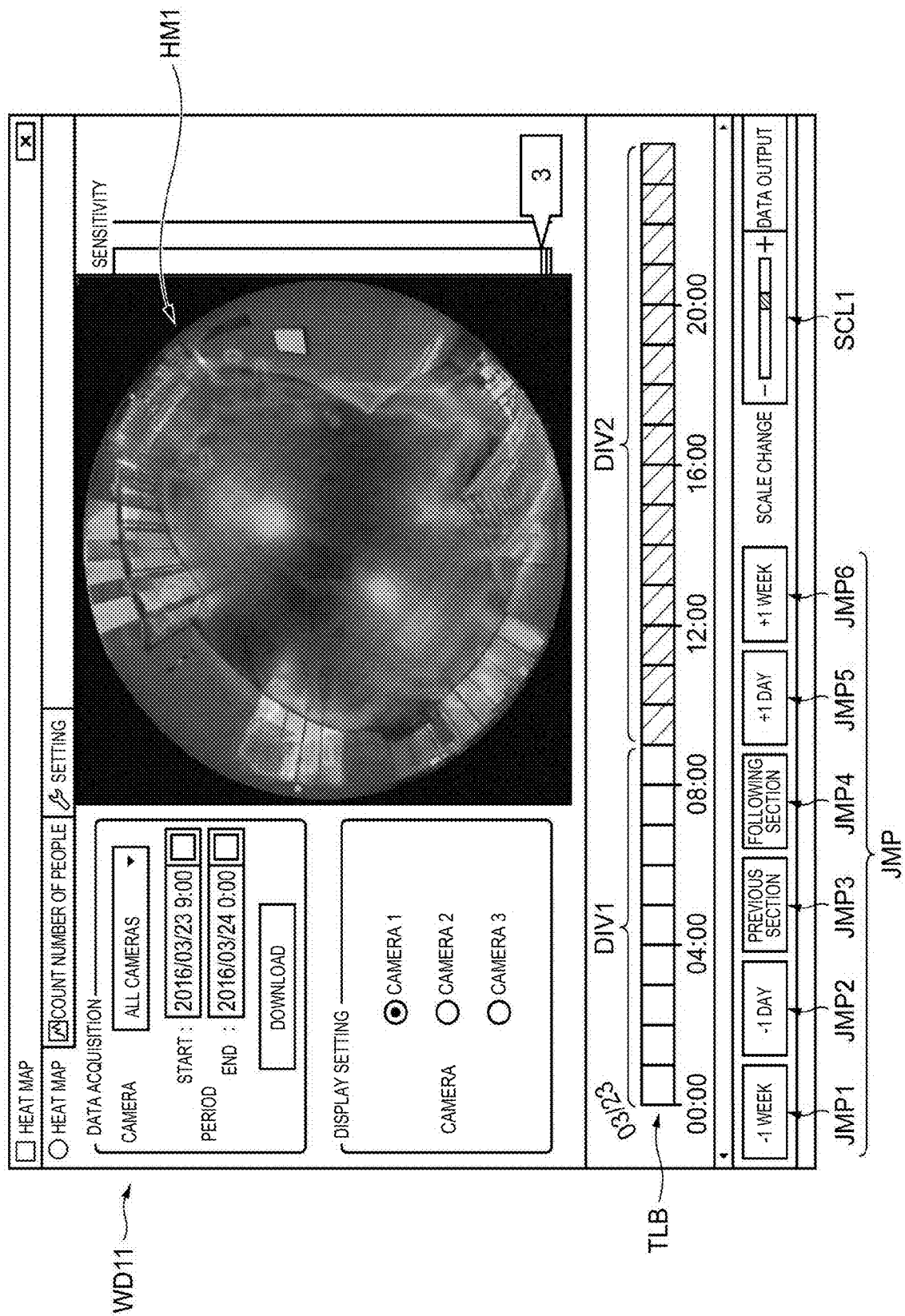
FIG. 18 is a diagram illustrating an example of an operation screen including a display setting column for switching between cameras of the store, generated by the display image generating section of the server according to a third modification example of the present exemplary embodiment.

Server 300 according to the third modification example of the present exemplary embodiment may display, for example, operation screen WD11 illustrated in FIG. 18 in addition to the operation screens illustrated in FIGS. 10, 11 and 14 when displaying an operation screen on monitor 450. FIG. 18 is a diagram illustrating an example of operation screen WD11 including a display setting column for switching between cameras of store A, generated by display image generating section 350 of server 300 according to the third modification example of the present exemplary embodiment. For example, moving information analysis image HM1 in which moving information obtained by any one of a plurality of cameras provided in store A is visually shown is displayed on operation screen WD11 illustrated in FIG. 18. As described in the present exemplary embodiment, moving information analysis image HM1 is generated by, for example, display image generating section 350 of server 300.

For example, in a case where moving information of a moving object (for example, a person) in store A is analyzed by moving information analyzing system 500A, for example, there is the need to develop marketing strategies by comparing pieces of moving information in different sales areas (for example, a fish sales area and a vegetable sales area) in the same time zone in store A with each other. In order to satisfy the need, in the third modification example of the present exemplary embodiment, if server 300 receives an operation of switching between cameras (camera switching operation) through an operation performed by a user (that is, an observer or a store manager of store A which is a wide observation object area), server 300 replaces a first moving information analysis image indicating moving information obtained by a camera imaging a fish sales area, displayed on operation screen WD11, with a moving information analysis image indicating moving information obtained by a camera imaging a vegetable sales area, and displays the moving information analysis image. Consequently, the user can compare details of moving information of people passing through the fish sales area and people passing through the vegetable sales area in the same time zone with each other and can thus understand the details thereof by switching between respective moving information analysis images. Therefore, for example, the user can efficiently develop marketing strategies regarding merchandise arrangement including arrangement of fishes and arrangement of vegetables.

Operation screen WD11 illustrated in FIG. 18 displays an input column (data acquisition column) for conditions for designating data (that is, background image data preserved in background image storing section 80 and extraction result data of moving information regarding staying information or passing information of a moving object preserved in passing/staying information storing section 90, and hereinafter, referred to as "camera transmission data") required to generate a moving information analysis image; an input column (display setting column) for a setting item regarding display of the moving information analysis image; moving information analysis image HM1; time line bar TLB; jump buttons JMP formed of a plurality of buttons; and scale changing button SCL1. Hereinafter, in description of FIG. 18, a description of the same content as that of the description of FIG. 14 will be made briefly or omitted, and different content will be described.

In the data acquisition column, the type of camera which is a request object of the camera transmission data (in other words, a display object of a moving information analysis image) and a generation period of the camera transmission data required to generate the moving information analysis image are designated. A download button pressed after the type of camera and the generation period of the camera transmission data are designated is displayed in the data acquisition column. If the download button is pressed, server 300 or input device 400 connected to server 300 requests the camera of the designated type to transmit the camera transmission data generated in the designated generation period to server 300. In operation screen WD11 illustrated in FIG. 18, all cameras (for example, three cameras) connected to server 300 are requested to transmit camera transmission data in a period from 9:00, Mar. 23, 2016 to 0:00, Mar. 24, 2016.

A plurality of camera selection buttons for selecting the types of cameras transmitting camera transmission data required to generate a moving information analysis image are displayed in the display setting column. For example, camera selection buttons for selecting a total of three cameras including camera 1 corresponding to camera 100, camera 2 corresponding to camera 100A, and camera 3 corresponding to camera 100N are displayed on operation screen WD11 illustrated in FIG. 18. Moving information analysis image HM1 currently displayed on operation screen WD11 illustrated in FIG. 18 is an image generated on the basis of camera transmission data from camera 1 when a camera selection button corresponding to camera 1 (that is, camera 100) is pressed.

The camera transmission data in the period from 9:00, Mar. 23, 2016 to 0:00, Mar. 24, 2016 is being received by server 300. Thus, as described in the second modification example of the present exemplary embodiment, in time line bar TLB corresponding to March 23 on operation screen WD11 illustrated in FIG. 18, a color (for example, red) indicating that there is camera transmission data is added to cells in this period unlike cells in another time zone. On the other hand, a color (for example, white or colorless) indicating that there is no camera transmission data is added to the cells (for example, 0:00, Mar. 23, 2016 to 9:00, Mar. 23, 2016) in another time zone.

Figure 19:
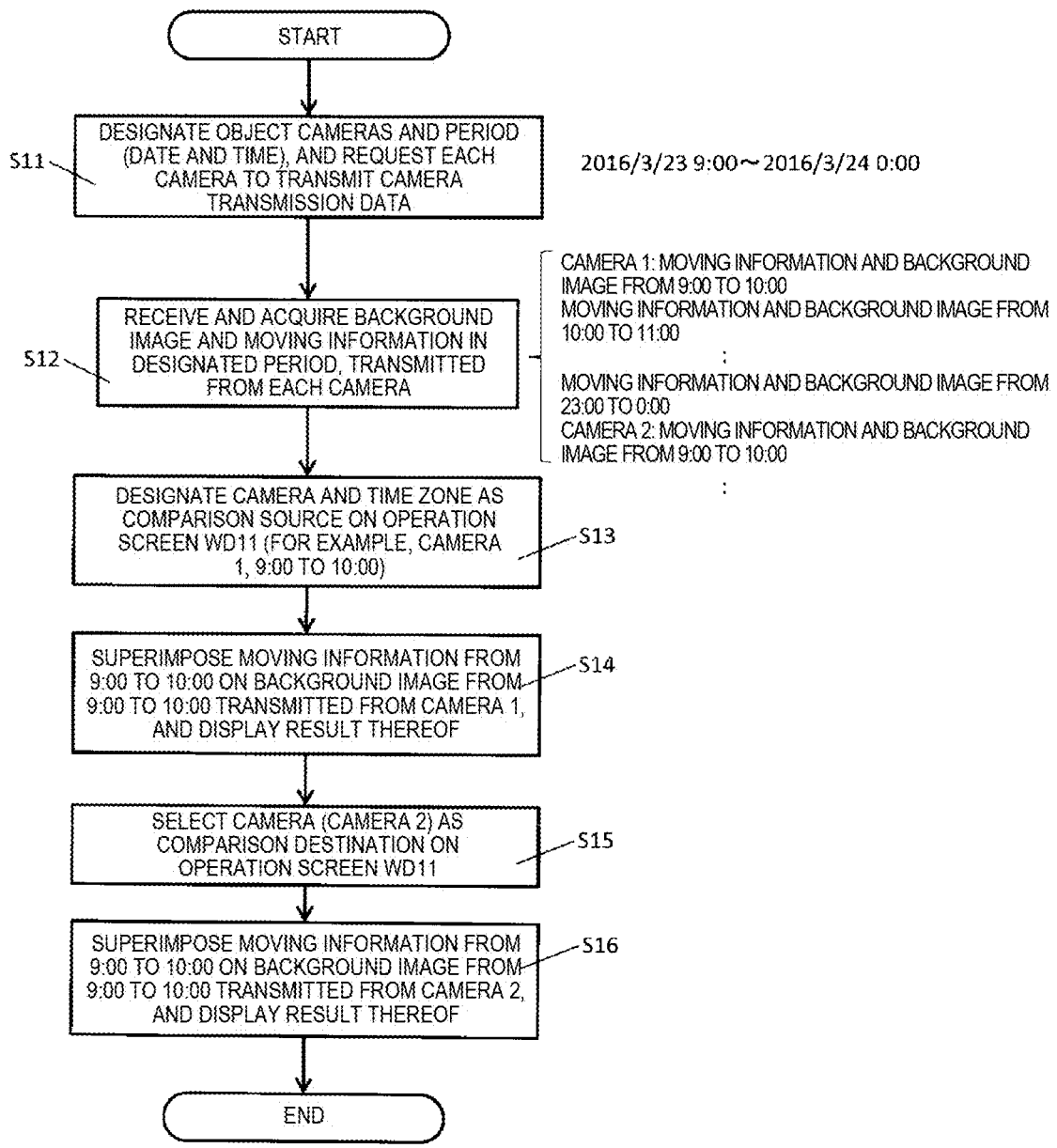
FIG. 19 is a flowchart illustrating examples of operation procedures of the server according to the third modification example of the present exemplary embodiment.
Figure 20:
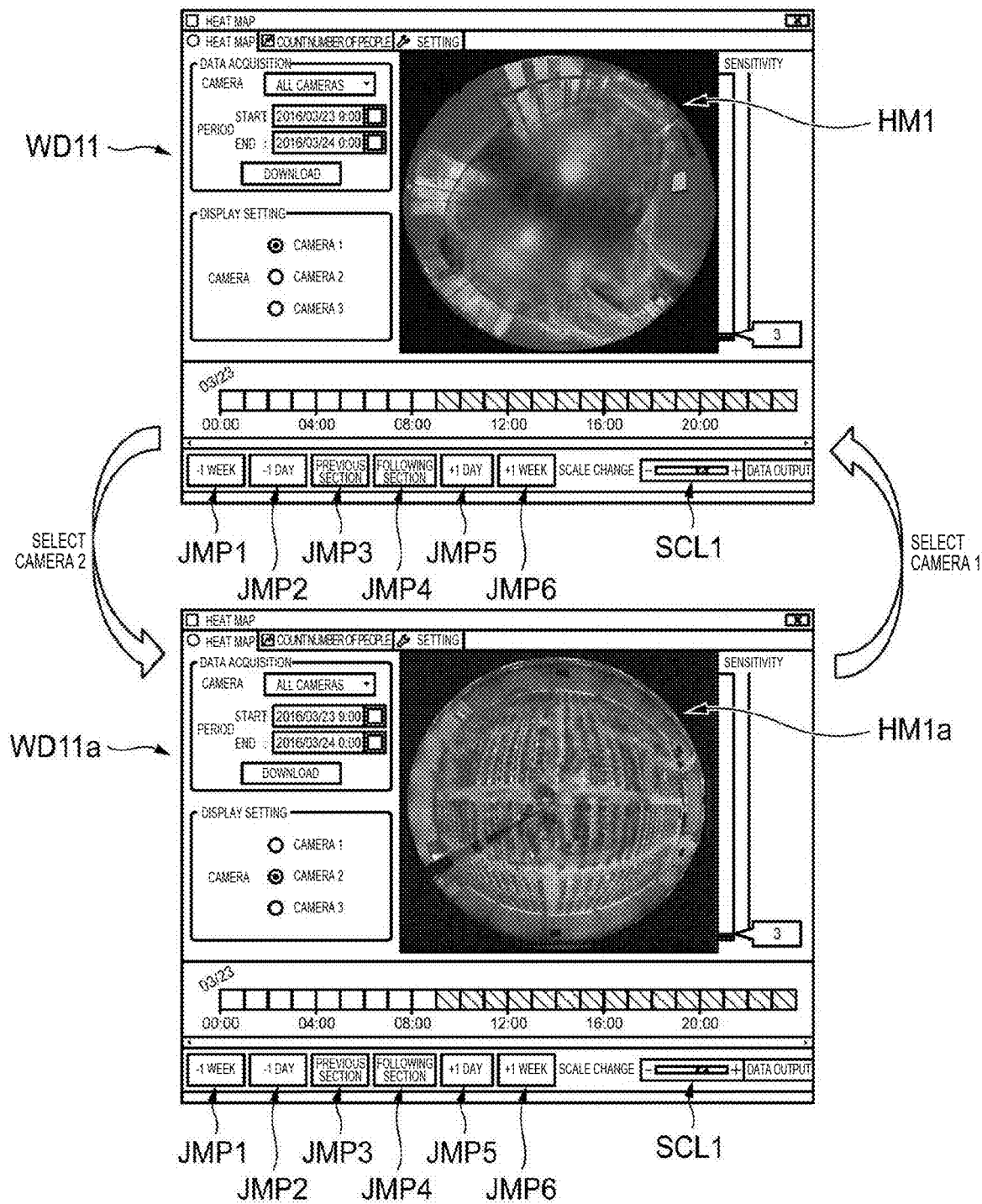
FIG. 20 is a diagram illustrating a switching display example of a moving information analysis image corresponding to pressing of a camera selection button in the display setting column illustrated in FIG. 18.

Next, a description will be made of operation procedures of server 300 according to the third modification example of the present exemplary embodiment with reference to FIGS. 19 and 20. FIG. 19 is a flowchart illustrating examples of operation procedures of server 300 according to the third modification example of the present exemplary embodiment. FIG. 20 is a diagram illustrating a switching display example of a moving information analysis image corresponding to pressing of any one of the camera selection buttons in the display setting column illustrated in FIG. 18. In the description based on FIG. 19, FIG. 20 is referred to as necessary.

In FIG. 19, for example, an object camera (for example, all cameras) and a period (9:00, Mar. 23, 2016 to 0:00, Mar. 24, 2016) are designated in the data acquisition column on operation screen WD11 illustrated in FIG. 18 according to an operation performed by a user using input device 400 (step S11). Through the designation, server 300 or input device 400 transmits a request for transmitting camera transmission data generated in the designated period to server 300, to corresponding cameras (here, all cameras, and, specifically, camera 100 corresponding to camera 1, camera 100A corresponding to camera 2, and camera 100N corresponding to camera 3) (step S11).

Each camera receiving the request in step S11 reads camera transmission data generated in the designated period in step S11 from background image storing section 80 or passing/staying information storing section 90 of the camera, and transmits the camera transmission data to server 300.

In the third modification example of the present exemplary embodiment, for example, each camera partitions a background image and moving information into background images and moving information corresponding to an hour according to the request in step S11, and transmits the background images and the moving information to server 300. Specifically, as illustrated in FIG. 19, the moving information and the background images are moving information and a background image in a period from 9:00 to 10:00, moving information and a background image in a period from 10:00 to 11:00, moving information and a background image in a period from 11:00 to 12:00, . . . , and moving information and a background image in a period from 23:00 to 0:00.

An hour which can be said to be a cycle of partitioning timings corresponds to a periodic execution cycle of the moving information extraction process and the background image generation process described with reference to FIGS. 5 to 8 of the above-described present exemplary embodiment. The execution cycle such as an hour may be changed as appropriate to another value (for example, 30 minutes) which is input through a user's operation by using an execution cycle changing menu on a setting item screen (not illustrated) which is displayed when a setting tap of operation screen WD11 illustrated in FIG. 18 is pressed.

Server 300 receives and acquires the camera transmission data (that is, each item of background image data and moving information data) which is transmitted from each camera and generated in the designated period in step S11 (step S12). Server 300 accumulates the camera transmission data in received information storing section 340.

Here, a camera and a time zone as a comparison source are designated on operation screen WD11 (step S13). For example, camera 100 corresponding to camera 1 and the time zone 9:00 to 10:00 are designated. The time zone 9:00 to 10:00 is designated, for example, by pressing a cell indicating the time zone 9:00 to 10:00 on time line bar TLB.

Display image generating section 350 of server 300 generates a moving information analysis image (heat map image) in which moving information in the time zone 9:00 to 10:00 is superimposed on a background image in the time zone 9:00 to 10:00 among items of camera transmission data transmitted from camera 100 corresponding to camera 1, and displays the moving information analysis image on monitor 450 (step S14).

Subsequently, only a camera which is a comparison destination is designated on operation screen WD11, for example, through an operation performed by the user using input device 400 (step S15). For example, camera 100A corresponding to camera 2 is designated (refer to FIG. 20). In other words, if the user temporarily designates a desired time zone (for example, 9:00 to 10:00) in step S13, it is not necessary to designate a time zone again in step S15 unless the time zone is changed, and only the next camera may be designated.

Display image generating section 350 of server 300 generates a moving information analysis image (heat map image) in which moving information in the same time zone is superimposed on a background image in the same time zone among items of camera transmission data transmitted from camera 100A corresponding to camera 2 designated in step S15, and displays the moving information analysis image on monitor 450 (step S16).

As mentioned above, if a transmission request is received from server 300 or input device 400 connected to server 300, each camera according to the third modification example of the present exemplary embodiment transmits a background image and moving information of a moving object (for example, a person) in a specific period (for example, 9:00, Mar. 23, 2016 to 0:00, Mar. 24, 2016) to server 300. Server 300 generates moving information analysis image HM1 in which moving information of a moving object (for example, a person) in an imaging region of camera 100 is superimposed on a background image transmitted from camera 100 corresponding to camera 1 among a plurality of cameras, and displays moving information analysis image HM1 on monitor 450 (refer to operation screen WD11 in FIGS. 18 and 20). If there is a camera switching operation from a user, server 300 generates moving information analysis image HM1a in which moving information of a moving object (for example, a person) in an imaging region of camera 100A is superimposed on a background image transmitted from camera 100A corresponding to camera 2 which is different from camera 1, and displays moving information analysis image HM1a on monitor 450 in a switching manner (refer to operation screen WD11a in FIG. 20).

Consequently, moving information analyzing system 500A according to the third modification example of the present exemplary embodiment instantaneously switches between and displays pieces of moving information obtained by the respective cameras (for example, cameras 100, 100A and 100N) imaging different individual sales areas in the same time zone on operation screen WD11 of monitor 450, so as to allow an observer (user) to perform easy comparison, thereby improving the user's convenience. In moving information analyzing system 500A, pieces of moving information obtained by cameras imaging different sales areas in the same time zone can be compared with each other and be also visually displayed in a state in which a moving object is removed from a captured image while protecting privacy of the moving object (person) reflected in an imaging region when a moving information analysis image is generated. For example, a user can compare details of moving information of people passing the fish sales area and people passing the vegetable sales area in the same time zone with each other and can thus understand the details thereof by switching between respective moving information analysis images. Therefore, for example, the user can efficiently develop marketing strategies regarding merchandise arrangement including arrangement of fishes and arrangement of vegetables.

For example, in a case where a first moving information analysis image in which moving information obtained by camera 100 corresponding to camera 1 is superimposed on a background image is displayed on monitor 450, server 300 according to the third modification example of the present exemplary embodiment displays a second moving information analysis image in which moving information of a moving object (for example, a person) is superimposed on the background image in the same time zone (for example, 9:00 to 10:00) as that of the first moving information analysis image, and displays the second moving information analysis image on monitor 450, as a result of receiving both of a camera switching operation and a time zone designation operation. Consequently, in server 300 according to the third modification example of the present exemplary embodiment, details of a moving information analysis image can be compared with each other in the unit (for example, 9:00 to 10:00) finer than a specific period (9:00, Mar. 23, 2016 to 0:00, Mar. 24, 2016) transmitted from each camera, and thus a user can perform detailed comparison.

Each camera according to the third modification example of the present exemplary embodiment repeatedly generates a background image of an imaging region, captured by the camera. Consequently, for example, even in a case where a layout regarding arrangement of merchandise in a wide observation object area is changed, each camera can periodically and repeatedly transmit a background image or moving information of a moving object (for example, a person) for the changed layout, to server 300. Therefore, server 300 can appropriately generate a moving information analysis image by using moving information and a background image even after a layout is changed, and thus a user can understand a difference between pieces of moving information of moving objects in detail through a simple operation such as an operation of switching between cameras imaging different sales areas regardless of a change of a layout.

In the third modification example of the present exemplary embodiment, moving information of a moving object (for example, a person) obtained by each camera is displayed on operation screen WD11, but the same effect can be achieved even if information regarding the number of people having passed a line set by a user for each camera is displayed.

History of Reaching Fourth Modification Example of Present Exemplary Embodiment

For example, according to the second modification example of the present exemplary embodiment, a user can check a time-series change of moving information corresponding to the user's preference by operating jump buttons JMP on operation screen WD1 one by one when monitoring moving information of passing people in an observation object area. However, since it is necessary for the user to operate jump buttons JMP one by one when switching between moving information analysis images, for example, in a case where both hands are occupied, an operation cannot be performed, and thus convenience may deteriorate. In relation to this fact, it is necessary to improve a user's operability.

Fourth Modification Example of Present Exemplary Embodiment

Therefore, in the following fourth modification example of the present exemplary embodiment, a description will be made of examples of a moving information analyzing system which switches between and displays pieces of moving information obtained by a camera capturing images of the same sales area so that a time-series change of the moving information can be understood, allows a user to easily perform comparison, improves the user's convenience, and contributes to efficiency of marketing, and a moving information analyzing method.

Since an internal configuration of a camera or a server forming moving information analyzing system 500A according to the fourth modification example of the present exemplary embodiment is the same as the internal configuration of the camera or the server forming moving information analyzing system 500 according to the present exemplary embodiment, the same constituent elements are given the same reference numerals, description thereof will be made briefly or omitted, and different content will be described. Moving information analyzing system 500A according to the fourth modification example of the present exemplary embodiment includes at least a plurality of cameras 100, and 100A to 100N, and server 300 (refer to FIG. 1).

Figure 21:
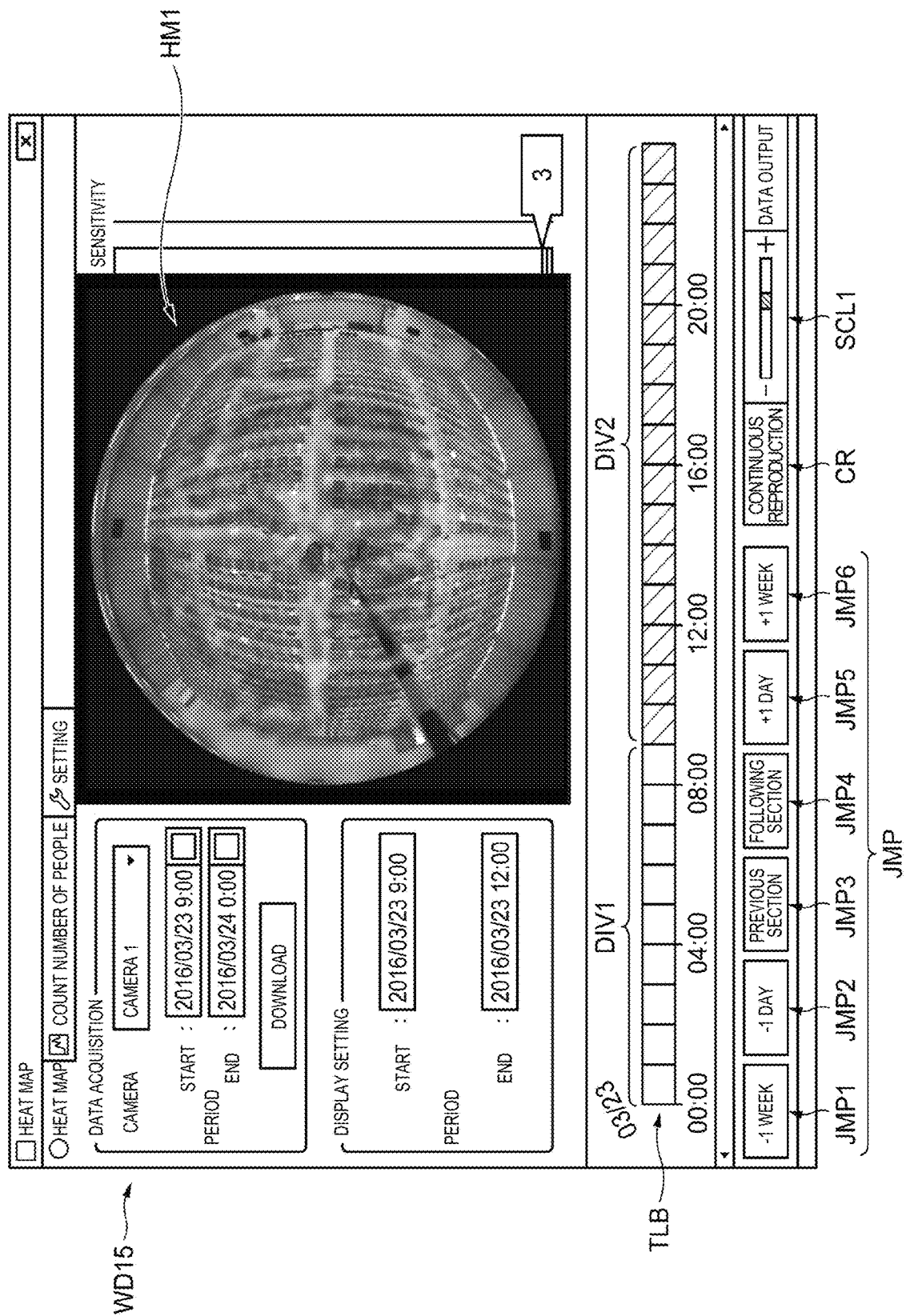
FIG. 21 is a diagram illustrating an example of an operation screen including a display setting column for designating a continuous reproduction period for moving information analysis images of the store generated by the display image generating section of the server according to a fourth modification example of the present exemplary embodiment.

Server 300 according to the fourth modification example of the present exemplary embodiment may display, for example, operation screen WD15 illustrated in FIG. 21 in addition to the operation screens illustrated in FIGS. 10, 11 and 14 when displaying an operation screen on monitor 450. FIG. 21 is a diagram illustrating an example of operation screen WD15 including a display setting column which allows a continuous reproduction period for moving information analysis images of store A generated by display image generating section 350 of server 300 according to the fourth modification example of the present exemplary embodiment. For example, moving information analysis image HM1 in which moving information obtained by any one of a plurality of cameras provided in store A is visually shown is displayed on operation screen WD15 illustrated in FIG. 21. As described in the present exemplary embodiment, moving information analysis image HM1 is generated by, for example, display image generating section 350 of server 300.

For example, in a case where moving information of a moving object (for example, a person) in store A is analyzed by moving information analyzing system 500A, for example, there is the need to develop marketing strategies by comparing temporal changes (for example, a change over time from 9:00 right after the store is open to 12:00 at lunch) of moving information in the same sales area (for example, a vegetable sales area) in store A with each other. In order to satisfy the need, in the fourth modification example of the present exemplary embodiment, if server 300 receives an a continuous reproduction operation for moving information analysis images through an operation performed by a user (that is, an observer (for example, a salesperson or a store manager) of store A which is a wide observation object area), server 300 generates a first moving information analysis image indicating moving information in a first predetermined period (for example, 9:00 to 10:00), obtained by a camera imaging a vegetable sales area displayed on operation screen WD15, and displays the moving information analysis image. Server 300 generates a second moving information analysis image indicating moving information in a second predetermined period (for example, 10:00 to 11:00) subsequent to the first predetermined period, obtained by the camera imaging the same vegetable sales area, and displays the second moving information analysis image. Server 300 switches between and displays respective moving information analysis images indicating moving information in respective periods, obtained by the camera imaging the same vegetable sales area in the same manner for the second predetermined period and subsequent periods. Consequently, the user can compare details of temporal changes of moving information of people passing through passing through the same vegetable sales area with each other and can thus understand the details thereof by switching between respective moving information analysis images generated in different time zones. Therefore, for example, the user can efficiently develop marketing strategies regarding merchandise arrangement including arrangement of vegetables adaptive to time zones.

Operation screen WD15 illustrated in FIG. 21 displays an input column (data acquisition column) for conditions for designating data (that is, background image data preserved in background image storing section 80 and extraction result data of moving information regarding staying information or passing information of a moving object preserved in passing/staying information storing section 90, and hereinafter, referred to as "camera transmission data") required to generate a moving information analysis image; an input column (display setting column) for a setting item regarding continuous reproduction of the moving information analysis image; moving information analysis image HM1; time line bar TLB; jump buttons JMP formed of a plurality of buttons; and scale changing button SCL1. Hereinafter, in description of FIG. 21, a description of the same content as that of the description of FIG. 14 will be made briefly or omitted, and different content will be described.

In the data acquisition column, the type of camera which is a request object of the camera transmission data (in other words, a display object of a moving information analysis image) and a generation period of the camera transmission data required to generate the moving information analysis image are designated. A download button pressed after the type of camera and the generation period of the camera transmission data are designated is displayed in the data acquisition column. If the download button is pressed, server 300 or input device 400 connected to server 300 requests the camera of the designated type to transmit the camera transmission data generated in the designated generation period to server 300. In operation screen WD15 illustrated in FIG. 21, camera 100 (also referred to as "camera 1") connected to server 300 are requested to transmit camera transmission data in a period from 9:00, Mar. 23, 2016 to 0:00, Mar. 24, 2016.

An input column for a period (in other words, a generation period of camera transmission data required to generate continuously reproduced moving information analysis images) of continuously reproduced moving information analysis images is displayed in the display setting column. For example, in operation screen WD15 illustrated in FIG. 21, a total of three hours from 9:00, Mar. 23, 2016 to 12:00, Mar. 23, 2016 are designated through an operation performed by a user using input device 400. Moving information analysis image HM1 currently displayed on operation screen WD15 illustrated in FIG. 21 is an image generated on the basis of a background image and moving information generated in a period from 9:00, Mar. 23, 2016 which is input as a start time point in the display setting column to 10:00 of the same day among pieces camera transmission data transmitted from camera 1 (that is, camera 100).

The camera transmission data in the period from 9:00, Mar. 23, 2016 to 0:00, Mar. 24, 2016 is being received by server 300. Thus, as described in the second modification example of the present exemplary embodiment, in time line bar TLB corresponding to March 23 on operation screen WD15 illustrated in FIG. 21, a color (for example, red) indicating that there is camera transmission data is added to cells in this period unlike cells in another time zone. On the other hand, a color (for example, white or colorless) indicating that there is no camera transmission data is added to the cells (for example, 0:00, Mar. 23, 2016 to 9:00, Mar. 23, 2016) in another time zone.

Continuous reproduction button CR is displayed on the right of jump buttons JMP in FIG. 21 on operation screen WD15 illustrated in FIG. 21. For example, continuous reproduction button CR is used to visually display details of temporal changes of moving information after a generation period of a background image and moving information necessary in moving information analysis image HM1 which is currently being displayed. Therefore, the user can visually understand not only currently displayed moving information analysis image HM1 but also details of temporal changes of moving information in each specific period (for example, an hour) thereafter from moving information analysis images by pressing continuous reproduction button CR.

Figure 22:
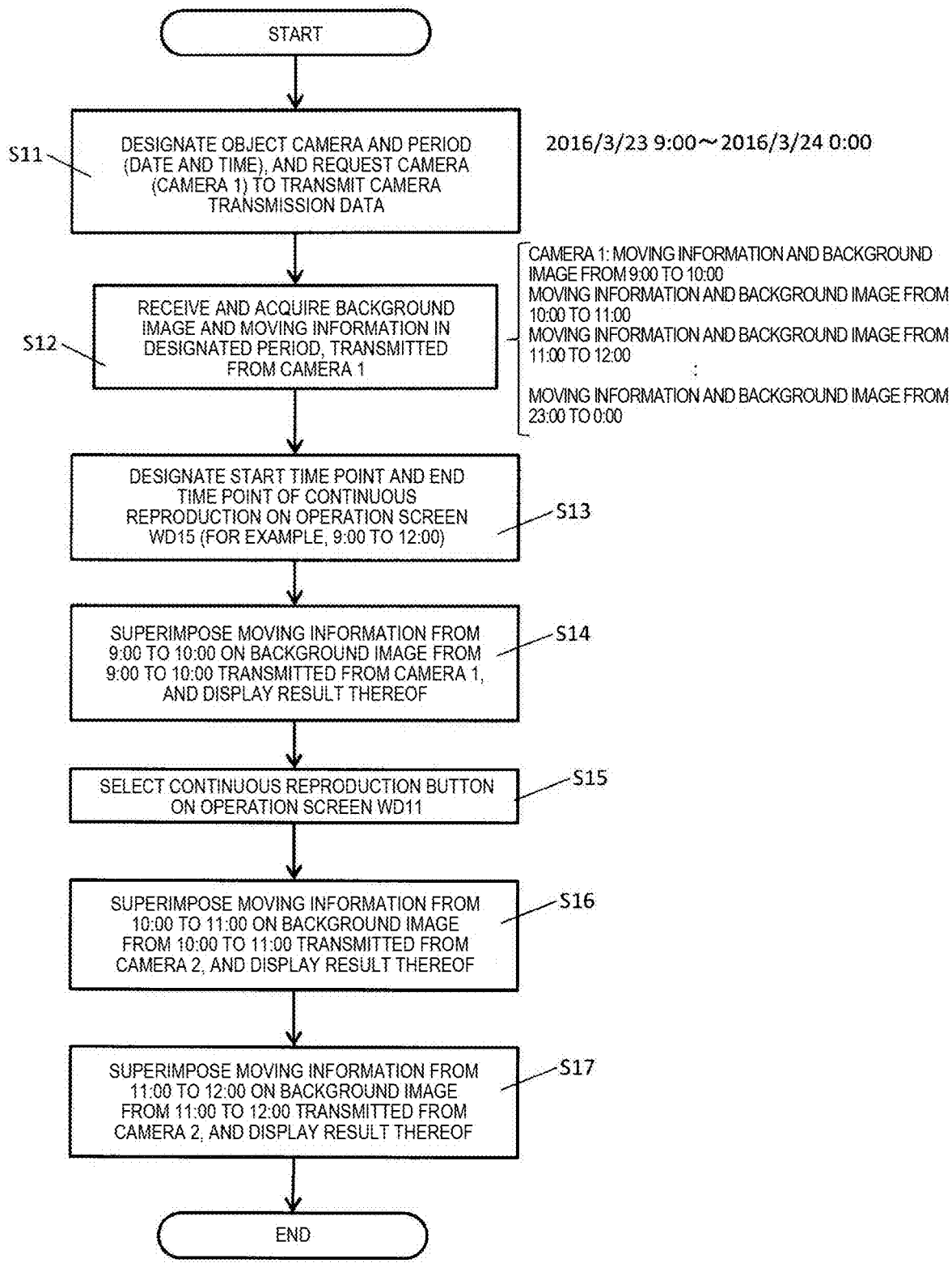
FIG. 22 is a flowchart illustrating examples of operation procedures of the server according to the fourth modification example of the present exemplary embodiment.
Figure 23:
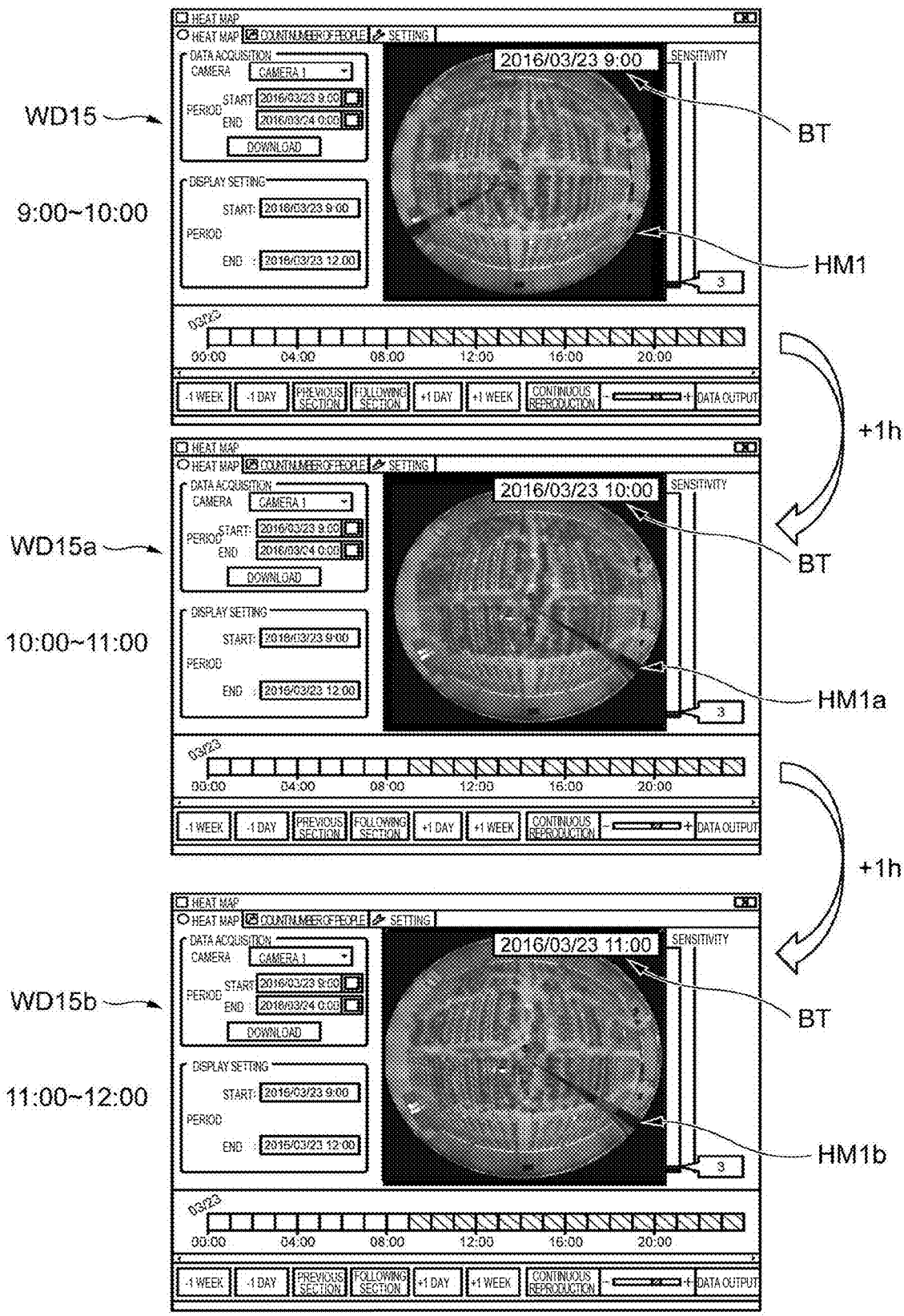
FIG. 23 is a diagram illustrating an example in which moving information analysis images are continuously reproduced in a continuous reproduction period in the display setting column illustrated in FIG. 21.

Next, a description will be made of operation procedures of server 300 according to the fourth modification example of the present exemplary embodiment with reference to FIGS. 22 and 23. FIG. 22 is a flowchart illustrating examples of operation procedures of server 300 according to the fourth modification example of the present exemplary embodiment. FIG. 23 is a diagram illustrating an example in which moving information analysis images are continuously reproduced in a continuous reproduction period illustrated in FIG. 21. In the description based on FIG. 22, FIG. 23 is referred to as necessary.

In FIG. 22, for example, an object camera (for example, camera 100 corresponding to camera 1) and a period (9:00, Mar. 23, 2016 to 0:00, Mar. 24, 2016) are designated in the data acquisition column on operation screen WD15 illustrated in FIG. 21 according to an operation performed by a user using input device 400 (step S11). Through the designation, server 300 or input device 400 transmits a request for transmitting camera transmission data generated in the designated period to server 300, to a corresponding camera (here, camera 100 corresponding to camera 1) (step S11).

Camera 100 (camera 1) receiving the request in step S11 reads camera transmission data generated in the designated period in step S11 from background image storing section 80 or passing/staying information storing section 90 of the camera, and transmits the camera transmission data to server 300.

In the fourth modification example of the present exemplary embodiment, for example, camera 100 (camera 1) partitions a background image and moving information into background images and moving information corresponding to an hour according to the request in step S11, and transmits the background images and the moving information to server 300. Specifically, as illustrated in FIG. 22, the moving information and the background images are moving information and a background image in a period from 9:00 to 10:00, moving information and a background image in a period from 10:00 to 11:00, moving information and a background image in a period from 11:00 to 12:00, . . . , and moving information and a background image in a period from 23:00 to 0:00.

An hour which can be said to be a cycle of partitioning timings corresponds to a periodic execution cycle of the moving information extraction process and the background image generation process described with reference to FIGS. 5 to 8 of the above-described present exemplary embodiment. The execution cycle such as an hour may be changed as appropriate to another value (for example, 30 minutes) which is input through a user's operation by using an execution cycle changing menu on a setting item screen (not illustrated) which is displayed when a setting tap of operation screen WD15 illustrated in FIG. 21 is pressed.

Server 300 receives and acquires the camera transmission data (that is, each item of background image data and moving information data) which is transmitted from camera 100 and generated in the designated period in step S11 (step S12). Server 300 accumulates the camera transmission data in received information storing section 340.

Here, a time zone (that is, the start time point and the end time point) in which moving information analysis images are continuously reproduced is designated on operation screen WD15 (step S13). For example, the time zone 9:00 to 12:00 is designated. The time zone 9:00 to 12:00 is designated, for example, by inputting 9:00 to a start time point of the display setting column, and inputting 12:00 to an end time point of the display setting column. As in FIG. 15 described in the second modification example of the present exemplary embodiment, the user operates input device 400 such as a mouse so as to specify the start time point (9:00) and the end time point (10:00) in which a moving information analysis image (heat map image) is displayed.

Display image generating section 350 of server 300 generates a moving information analysis image (heat map image) in which moving information in the time zone 9:00 to 10:00 is superimposed on a background image in the time zone 9:00 to 10:00 among items of camera transmission data transmitted from camera 100 corresponding to camera 1, and displays the moving information analysis image on monitor 450 (step S14; refer to FIG. 23). Start time point BT (for example, 9:00, Mar. 23, 2016) of the generation period of camera transmission data required to generate moving information analysis image HM1 may be displayed on operation screen WD15 on the uppermost part of FIG. 23.

Subsequently, continuous reproduction button CR is selected on operation screen WD15, for example, through an operation performed by the user using input device 400 (step S15). Specifically, continuous reproduction button CR is pressed.

When continuous reproduction button CR is pressed in step S15, display image generating section 350 of server 300 generates moving information analysis image HM1a (heat map image) in which moving information from 10:00 to 11:00 is superimposed on a background image from 10:00 to 11:00 (second predetermined period) subsequent to 9:00 to 10:00 (first predetermined period) among pieces of camera transmission data transmitted from camera 100 corresponding to camera 1, and displays moving information analysis image HM1a on monitor 450 (step S16; refer to FIG. 23). Start time point BT (for example, 10:00, Mar. 23, 2016) of the generation period of camera transmission data required to generate moving information analysis image HM1a may be displayed on operation screen WD15a on the intermediate part of FIG. 23.

Next to step S16, for example, after two seconds elapse, automatically without waiting for the user's operation, display image generating section 350 of server 300 generates moving information analysis image HM1b (heat map image) in which moving information from 11:00 to 12:00 is superimposed on a background image from 11:00 to 12:00 (third predetermined period) subsequent to 10:00 to 11:00 (second predetermined period) among pieces of camera transmission data transmitted from camera 100 corresponding to camera 1, and displays moving information analysis image HM1b on monitor 450 (step S17; refer to FIG. 23). Start time point BT (for example, 11:00, Mar. 23, 2016) of the generation period of camera transmission data required to generate moving information analysis image HM1b may be displayed on operation screen WD15b on the lowermost part of FIG. 23.

As mentioned above, if a transmission request is received from server 300 or input device 400 connected to server 300, camera 100 (camera 1) according to the fourth modification example of the present exemplary embodiment transmits a background image and moving information of a moving object (for example, a person) in a specific period (for example, 9:00, Mar. 23, 2016 to 0:00, Mar. 24, 2016) to server 300. Server 300 generates moving information analysis image HM1 in which moving information of a moving object (for example, a person) corresponding to an hour from 9:00 to 10:00 in an imaging region of camera 100 (camera 1) is superimposed on a background image corresponding to an hour at 9:00 to 10:00 transmitted from camera 100 (camera 1), and displays the moving information analysis image HM1 on monitor 450 (refer to operation screen WD15 in FIGS. 21 and 23). If there is a continuous reproduction operation (for example, pressing of continuous reproduction button CR) from a user, server 300 generates moving information analysis image HM1a in which moving information of a moving object (for example, a person) corresponding to an hour from 10:00 to 11:00 is superimposed on a background image corresponding to an hour from 10:00 to 11:00, and displays the moving information analysis image HM1a on monitor 450 in a switching manner (refer to operation screen WD15a in FIG. 23). Server 300 generates moving information analysis image HM1b in which moving information of a moving object (for example, a person) corresponding to an hour from 11:00 to 12:00 in an imaging region of camera 100 (camera 1) is superimposed on a background image corresponding to an hour from 11:00 to 12:00, and displays the moving information analysis image HM1b on monitor 450 in a switching manner (refer to operation screen WD15b in FIG. 23).

Consequently, moving information analyzing system 500A according to the fourth modification example of the present exemplary embodiment can sequentially display moving information analysis images indicating moving information obtained in different time zones in a switching manner at an interval of a predetermined time (for example, two seconds) on operation screen WD15 of monitor 450 so that temporal changes of moving information obtained by camera 100 capturing images of the same sales area can be understood. In other words, a user who is an observer of moving information in the sales area can observe temporal change of moving information of people in the sales area through simple comparison, and thus it is possible to improve the user's convenience. Consequently, for example, the user can efficiently develop marketing strategies regarding merchandise arrangement including arrangement of vegetables adaptive to time zones of business hours, and can thus improve efficiency of marketing. Consequently, moving information analyzing system 500A can visually display pieces of moving information obtained by camera 100 capturing images of the same sales areas so that the pieces of moving information can be compared with each other, in a state in which a moving object is removed from the captured image while appropriately protecting privacy of the moving object (person) reflected in an imaging region when a moving information analysis image is generated.

Moving information analysis images which are continuously reproduced by server 300 according to the fourth modification example of the present exemplary embodiment are generated on the basis of background images and moving information obtained in the same time zone length (for example, an hour from 9:00 to 10:00, and an hour from 10:00 to 11:00) by camera 100. Consequently, moving information analysis images generated on the basis of background images and moving information obtained for each specific period such as an hour are continuously reproduced, and thus the user can more appropriately compare characteristics of behaviors of people who go around a store with each other.

In response to a continuous reproduction operation including designation of a continuous reproduction period (for example, a period from 9:00, Mar. 23, 2016 to 12:00, Mar. 23, 2016), server 300 according to the fourth modification example of the present exemplary embodiment generates moving information analysis images in which moving information in an imaging region of camera 100 (camera 1) in respective predetermined periods is superimposed on background images in the respective predetermined periods subsequent to 10:00 to 11:00, Mar. 23, 2016, and sequentially displays the moving information analysis images on monitor 450. Consequently, in a case where temporal change or the like of moving information analysis images are desired to be understood, server 300 according to the fourth modification example of the present exemplary embodiment can switch between and reproduce moving information analysis images every hour corresponding to a period (for example, a period from 9:00, Mar. 23, 2016 to 0:00, Mar. 24, 2016) designated in advance for continuous reproduction without particularly performing an operation of switching between time zones, and thus it is possible to easily check the moving information analysis images.

Camera 100 according to the fourth modification example of the present exemplary embodiment repeatedly generates a background image of an imaging region, obtained by capturing an image of the imaging region (that is, the imaging region of camera 100). Consequently, for example, even in a case where a layout regarding arrangement of merchandise in an observation object area is changed, camera 100 can periodically and repeatedly transmit a background image or moving information of a moving object (for example, a person) for the changed layout, to server 300. Therefore, server 300 can appropriately generate a moving information analysis image by using moving information and a background image even after a layout is changed, and thus a user can understand details of temporal changes or the like of moving information of a moving object through a simple operation such as a continuous reproduction operation, for example, pressing of continuous reproduction button CR, regardless of a change of a layout.

In the fourth modification example of the present exemplary embodiment, a temporal change of moving information of a moving object is displayed, but the same effect can be achieved even if a temporal change of information regarding the number of people having passed a line set by a user is displayed.

What is claimed is:

1. A moving information analyzing system comprising:
a plurality of cameras; and
a server that is connected to the plurality of cameras,
wherein each of the plurality of cameras:
generates a background image of an imaging region captured by the camera,
extracts moving information regarding a staying position or a passing position of a moving object in the imaging region of the camera, and
transmits the background image and moving information of the moving object in a specific period to the server in response to a transmission request from the server or an input device connected to the server, and
wherein the server downloads respective background image and moving information for each camera of the plurality of cameras,
wherein, in a case where a first moving information analysis image in which moving information indicating a passing position of a plurality of moving objects in an imaging region of a first camera is superimposed on the background image downloaded from the first camera among the plurality of cameras is generated and displayed on a monitor, the server generates a second moving information analysis image in which moving information indicating a passing position of a plurality of moving objects in an imaging region of a second camera is superimposed on the background image downloaded from the second camera which is different from the first camera among the plurality of cameras in response to a camera switching operation, and displays the second moving information analysis image on the monitor, and the server,
  causes a plurality of camera selection buttons, respectively corresponding to the plurality of cameras, to be displayed on the monitor when the first moving information analysis image or the second moving information analysis image is displayed on the monitor, each displayed camera selection button of the plurality of camera selection buttons corresponding to a camera having respective background image and moving information downloaded from the camera to the server,
  receiving, from a user, a selection of a camera selection button from the plurality of camera selection buttons, and
  in response to receiving the selection of the camera selection button from the plurality of camera selection buttons, retrieving the background image and moving information of the moving object of the camera corresponding to the selected camera selection button, the first moving information analysis image or the second moving analysis image displayed on the monitor corresponding to the camera corresponding to the selected camera selection button.

2. The moving information analyzing system of claim 1, wherein, in a case where the first moving information analysis image is displayed on the monitor, the server displays, on the monitor, the second moving information analysis image in which moving information of a moving object is superimposed on a background image in the same time zone as a time zone of the first moving information analysis image in response to the camera switching operation and a time zone designation operation.

3. The moving information analyzing system of claim 1, wherein the plurality of cameras repeatedly generate the background image.

4. A moving information analyzing method for a moving information analyzing system in which a plurality of cameras are connected to a server, the method comprising:
  causing each of the plurality of cameras to:
    generate a background image of an imaging region captured by the camera,
    extract moving information regarding a staying position or a passing position of a moving object in the imaging region of the camera, and
    transmit the background image and moving information of the moving object in a specific period to the server in response to a transmission request from the server or an input device connected to the server; and
  causing the server to:
    download respective background image and moving information for each camera of the plurality of cameras,
    generate a first moving information analysis image in which moving information indicating a passing position of a plurality of moving objects in an imaging region of a first camera is superimposed on the background image downloaded from the first camera among the plurality of cameras, and to display the first moving information analysis image on a monitor,
    to generate a second moving information analysis image in which moving information indicating a passing position of a plurality of moving objects in an imaging region of a second camera is superimposed on the background image downloaded from the second camera which is different from the first camera among the plurality of cameras in response to a camera switching operation, and to display the second moving information analysis image on the monitor,
    generate a plurality of camera selection buttons respectively corresponding to the plurality of cameras,
    cause the plurality of camera selection buttons respectively corresponding to the plurality of cameras to be displayed on the monitor when the first moving information analysis image or the second moving information analysis image is displayed on the monitor, each displayed camera selection button of the plurality of camera selection buttons corresponding to a camera having respective background image and moving information downloaded from the camera to the server,
    receiving, from a user, a selection of a camera selection button from the plurality of camera selection buttons, and
    in response to receiving the selection of the camera selection button from the plurality of camera selection buttons, retrieving the background image and moving information of the moving object of the camera corresponding to the selected camera selection button, the first moving information analysis image or the second moving analysis image displayed on the monitor corresponding to the camera corresponding to the selected camera selection button.

5. A moving information analyzing system comprising:
a camera of a plurality of cameras; and
a server that is connected to the camera,
wherein the camera:
  generates a background image of an imaging region obtained by imaging the imaging region,
  extracts moving information regarding a staying position or a passing position of a moving object in the imaging region, and
  transmits the background image and moving information of the moving object in a specific period to the server in response to a transmission request from the server or an input device connected to the server, and
wherein the server:
  downloads respective background image and moving information for each camera of the plurality of cameras,
  generates a first moving information analysis image in which moving information indicating a passing position of a plurality of moving objects in a first predetermined period in the imaging region of the camera is superimposed on a background image in the first predetermined period as a part of the specific period, downloaded from the camera, and displays the first moving information analysis image on a monitor,
  generates a second moving information analysis image in which moving information indicating a passing position of a plurality of moving objects in a second predetermined period subsequent to the first predetermined period in the imaging region of the camera is superimposed on a background image in the second predetermined period of the specific period, downloaded from the camera in response to a continuous reproduction operation, and displays the second moving information analysis image on the monitor, causes a plurality of camera selection buttons, respectively corresponding to the plurality of cameras, to be displayed on the monitor when the first moving information analysis image or the second moving information analysis image is displayed on the monitor, each displayed camera selection button of the plurality of camera selection buttons corresponding to a camera having respective background image and moving information downloaded from the camera to the server, receives, from a user, a selection of a camera selection button from the plurality of camera selection buttons, and in response to receiving the selection of the camera selection button from the plurality of camera selection buttons, retrieving the background image and moving information of the moving object of the camera corresponding to the selected camera selection button, the first moving information analysis image or the second moving analysis image displayed on the monitor corresponding to the camera corresponding to the selected camera selection button.

6. The moving information analyzing system of claim 5, wherein the first predetermined period has the same length as a length of the second predetermined period.

7. The moving information analyzing system of claim 5, wherein the server generates moving information analysis images in which moving information of a moving object in respective predetermined periods after a third predetermined period subsequent to the second predetermined period in the imaging region of the camera is superimposed on background images in the respective predetermined periods after the third predetermined period in response to the continuous reproduction operation including designation of a continuous reproduction period until the continuous reproduction period ends, and sequentially displays the moving information analysis images on the monitor.

8. The moving information analyzing system of claim 5, wherein the camera repeatedly generates the background image.

9. A moving information analyzing method for a moving information analyzing system in which a camera of a plurality of cameras is connected to a server, the method comprising:

causing the camera of the plurality of cameras to:
generate a background image of an imaging region obtained by imaging the imaging region, extract moving information regarding a staying position or a passing position of a moving object in the imaging region, and transmit the background image and moving information of the moving object in a specific period to the server in response to a transmission request from the server or an input device connected to the server; and causing the server to:
download respective background image and moving information for each camera of the plurality of cameras, generate a first moving information analysis image in which moving information indicating a passing position of a plurality of moving objects in a first predetermined period in the imaging region of the camera is superimposed on a background image in the first predetermined period as a part of the specific period, downloaded from the camera, and to display the first moving information analysis image on a monitor, generate a second moving information analysis image in which moving information indicating a passing position of a plurality of moving objects in a second predetermined period subsequent to the first predetermined period in the imaging region of the camera is superimposed on a background image in the second predetermined period of the specific period, downloaded from the camera in response to a continuous reproduction operation, and to display the second moving information analysis image on the monitor, generate a camera selection button corresponding to the camera, and cause a plurality of camera selection buttons including the camera selection button corresponding to the camera to be displayed on the monitor when the first moving information analysis image or the second moving information analysis image is displayed on the monitor, each displayed camera selection button of the plurality of camera selection buttons corresponding to a camera having respective background image and moving information downloaded from the camera to the server, receive, from a user, a selection of the camera selection button corresponding to the camera from the plurality of camera selection buttons, and in response to receiving the selection of the camera selection button corresponding to the camera from the plurality of camera selection buttons, retrieving the background image and moving information of the moving object of the camera, the first moving information analysis image or the second moving analysis image displayed on the monitor corresponding to a camera corresponding to a selected camera selection button.

* * * * *